United States Patent
Yang et al.

(10) Patent No.: US 12,457,594 B2
(45) Date of Patent: *Oct. 28, 2025

(54) RAN APPLICATIONS FOR INTER-CELL INTERFERENCE MITIGATION FOR MASSIVE MIMO IN A RAN

(71) Applicant: VMware LLC, Palo Alto, CA (US)

(72) Inventors: Yang Yang, Morris Plains, NJ (US); Neha Paranjape, Los Gatos, CA (US); Deepa Muthunoori, Milpitas, CA (US); Ish Kumar Jain, San Diego, CA (US)

(73) Assignee: VMware LLC, Palo Alto, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 18/221,355

(22) Filed: Jul. 12, 2023

(65) Prior Publication Data
US 2024/0291624 A1 Aug. 29, 2024

Related U.S. Application Data

(60) Provisional application No. 63/448,668, filed on Feb. 28, 2023.

(51) Int. Cl.
*H04W 72/0453* (2023.01)
*H04B 7/06* (2006.01)
(Continued)

(52) U.S. Cl.
CPC ...... *H04W 72/0453* (2013.01); *H04B 7/0632* (2013.01); *H04L 5/0073* (2013.01);
(Continued)

(58) Field of Classification Search
CPC ........... H04W 72/0453; H04W 72/541; H04W 72/535; H04W 24/06; H04W 72/046; H04B 7/0632; H04L 5/0073
See application file for complete search history.

(56) References Cited

FOREIGN PATENT DOCUMENTS

| GB | 2313742 A | * | 12/1997 | ............ H04W 16/02 |
| WO | WO-2021152634 A1 | * | 8/2021 | ........... H04L 5/0032 |

OTHER PUBLICATIONS

Non-Published Commonly Owned Related U.S. Appl. No. 18/221,357 with similar specification, filed Jul. 12, 2023, 53 pages, VMware, Inc.

(Continued)

*Primary Examiner* — Gary Mui
*Assistant Examiner* — Nancy Sixto
(74) *Attorney, Agent, or Firm* — Quarles & Brady LLP

(57) ABSTRACT

Some embodiments of the invention provide a method for mitigating inter-region interference for multiple regions serviced by multiple RAN (Radio Access Network) base stations. The method is performed for each region serviced by each particular RAN base station. The method identifies a set of one or more sub-regions receiving interfering signals from other RAN base stations. The method specifies, for each particular sub-region in the identified set of sub-regions that receives interfering signals from the particular RAN base station and another RAN base station, (1) an allow policy that identifies an allowed first set of carrier resources of the particular RAN base station that are to be allocated to a set of one or more user equipments operating in the particular sub-region, and (2) a block policy that identifies a blocked second set of carrier resource of the other RAN base station that correspond to the first set of resources and that cannot be allocated to the set of user equipments operating in the particular sub-region. The method distributes the specified allow and block policies to the RAN base stations.

18 Claims, 17 Drawing Sheets

(51) Int. Cl.
*H04L 5/00* (2006.01)
*H04W 24/06* (2009.01)
*H04W 72/044* (2023.01)
*H04W 72/50* (2023.01)
*H04W 72/541* (2023.01)

(52) U.S. Cl.
CPC ......... *H04W 24/06* (2013.01); *H04W 72/046* (2013.01); *H04W 72/535* (2023.01); *H04W 72/541* (2023.01)

(56) References Cited

OTHER PUBLICATIONS

Non-Published Commonly Owned Related U.S. Appl. No. 18/221,359 with similar specification, filed Jul. 12, 2023, 54 pages, VMware, Inc.

\* cited by examiner

Table 100:

| Cell | Edge Area | Resource Needed | Top interferer & beam direction |
|---|---|---|---|
| Cell_A | e1 | 10% | Cell_B & b3 |
| | e2 | 5% | Cell_C & b6 |
| Cell_B | e3 | 0% | Cell_A & b1 |
| | e4 | 20% | Cell_C & b5 |
| Cell_C | e5 | 10% | Cell_B & b4 |
| | e6 | 10% | Cell_A & b2 |

Table 120:

| Policies | Allowance | Avoidance |
|---|---|---|
| Cell_A | R1-R2 (for e1) | R15-R16 (for b2) |
| | R4 (for e2) | R1-R2 (for b3) |
| Cell_B | R5-R8 (for e4) | R10-R11 (for b4) |
| Cell_C | R10-R11 (for e5) | R5-R8 (for b5) |
| | R15-R16 (for e6) | R4 (for b6) |

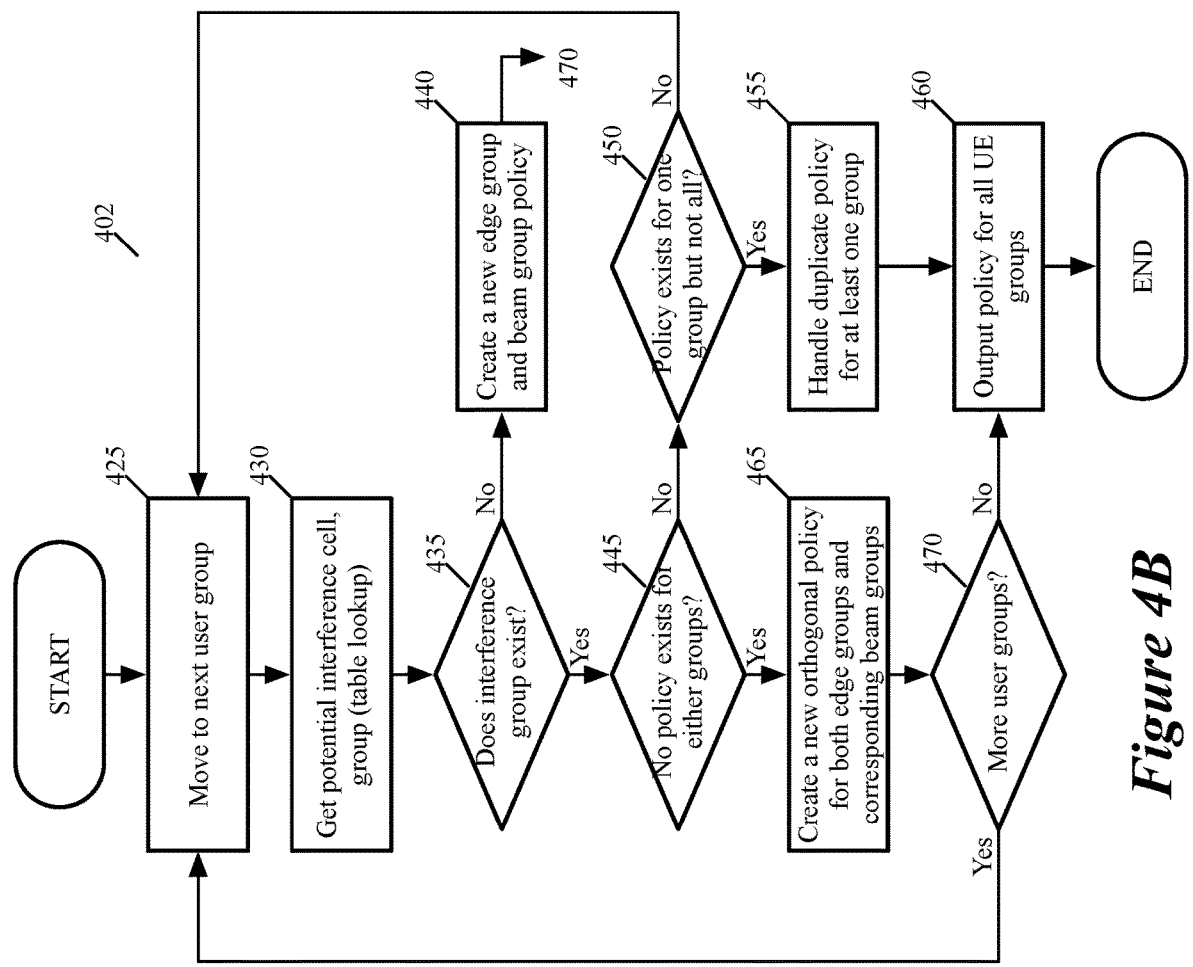
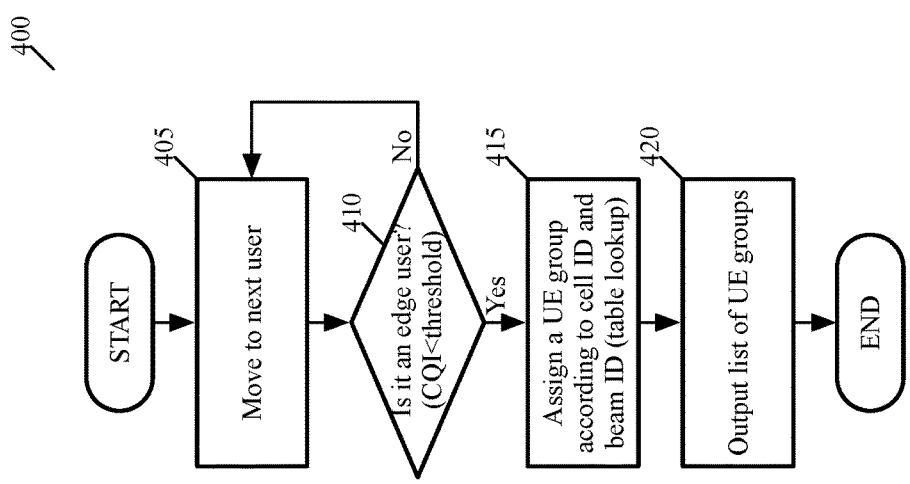
*Figure 4B*
*Figure 4A*

```
e2sm_kpm_action_defn_format_4_t:
e2sm_kpm_test_cond_info_t     *test_cond_list;     // see below
uint32_t test_cond_list_len = 1
e2sm_kpm_meas_info_t *meas_info_list;              // see below
uint32_t meas_info_list_len = 3
setting of *test_cond_list:
union {
  uint32_t val_int =0    // all users
  ...
} value;
e2sm_kpm_test_cond_type_e cond_type   = E2SM_KPM_TEST_COND_TYPE_AMBR
e2sm_kpm_test_cond_expression_e cond_expr =
E2SM_KPM_TEST_COND_EXPRESSION_GREATER_THAN
e2sm_kpm_test_cond_value_type_e value_type =
E2SM_KPM_TEST_COND_VALUE_TYPE_INT setting of *meas_info_list:
e2sm_kpm_meas_identifier_t meas_identifier;  // CQI/PRB/Throughput, same as
Porto.
e2sm_kpm_meas_label_t *meas_label_list = NoLabel
uint32_t meas_label_list_len = 1
```

*Figure 12*

```
e2sm_common_ue_id_t             *ue_id_list;
e2sm_kpm_ind_msg_format_1_t     *ue_meas_list;
uint32_t                         ue_meas_list_len = cell::nbr_users;
setting of ie_id_list[m] is:
union {
  e2sm_common_gnbdu_ueid_t      du_ueid;
  ...
} ueid;
e2sm_common_ueid_type_e     ueid_type = E2SM_COMMON_UEID_GNB_DU;
setting of du_ueid:
uint32_t ue_f1ap_id = UE_ID[m];
uint8_t ran_ueid_present = 0;
```

*Figure 13*

```
e2sm_kpm_meas_info_t *meas_info_list;   // not present
uint32_t meas_info_list_len = 0;
e2sm_kpm_meas_data_t *meas_data_list;
uint32_t meas_data_list_len = 1;
uint8_t granularity_period_present = 0;
```

*Figure 14*

```
e2sm_kpm_meas_record_t *record_list;
uint8_t incomplete_flag = 0;
uint32_t record_list_len = 16 + 1 + 1 = 18;
         setting of record_list for CQI: 16 records.
union {
int int_val = 0 except for the entry index = user_attr[ue_id]->cqi. for that
entry, int_val = round(period / 20) where period = KPM reporting period in
unit of msec.
...
} value;
e2sm_kpm_meas_record_type_e record_type = E2SM_KPM_MEAS_RECORD_TYPE_INTEGER;
```

*Figure 15*

```
union {
int int_val = user_perf[ue_id]->sum_nbr_rbgs.
...
} value;
e2sm_kpm_meas_record_type_e record_type = E2SM_KPM_MEAS_RECORD_TYPE_INTEGER;
```

*Figure 16*

```
union {
int int_real = user_perf[ue_id]->avg_tx_rate for that user.
...
} value;
e2sm_kpm_meas_record_type_e record_type = E2SM_KPM_MEAS_RECORD_TYPE_INTEGER;
```

*Figure 17*

```
e2sm_common_ue_id_t                     ctrl_ue_id;   // same as above
e2sm_rc_control_action_enum_e           ctrl_action;
uint8_t ric_ctrl_decision_present =0;
setting of ctrl_action:
e2sm_rc_control_style_e ctrl_style =E2SM_RC_CONTROL_STYLE_UE_INFO_ASSIGNMENT;
uint32_t ctrl_action = 1;
```

*Figure 18*

```
e2sm_rc_param_value_t        *ctrl_param;
uint16_t                                  ctrl_param_len = 2;
setting of 1st ctrl_param:
param_id = 1;
 param_value:
union {
e2sm_rc_ran_param_value_t        nokey_element;
...
} value;
e2sm_rc_ran_param_type_e param_type = E2SM_RC_RAN_PARAM_TYPE_FALSE;
setting of nokey_element:
union {
uint32_t val_int = ue_group_id;    // assigned by xApp
...
} value;
e2sm_rc_ran_param_val_type_e value_type = E2SM_RC_RAN_PARAM_VAL_TYPE_INT;
```

*Figure 19*

```
param_id = 2;
param_value:
union {
e2sm_rc_ran_param_value_t        nokey_element;
...
} value;
e2sm_rc_ran_param_type_e param_type = E2SM_RC_RAN_PARAM_TYPE_FALSE;
setting of nokey_element:
union {
uint32_t val_int = 1;        // per O-RAN: 1 means Add UE.    2 means Remove UE.
...
} value;
e2sm_rc_ran_param_val_type_e value_type = E2SM_RC_RAN_PARAM_VAL_TYPE_INT;
```

*Figure 20*

```
e2sm_common_ue_id_t                    ctrl_ue_id;  // needs
customization
e2sm_rc_control_action_enum_e          ctrl_action;
uint8_t ric_ctrl_decision_present =0;
setting of ctrl_ue_id:
union {
e2sm_common_gnbdu_ueid_t      du_ueid;
...
} ueid;
e2sm_common_ueid_type_e   ueid_type = E2SM_COMMON_UEID_GNB_DU;
setting of du_ueid:
uint32_t ue_flap_id = cell_idx;  // this is same customization used in the
Porto xApp ControlReq.
uint8_t ran_ueid_present = 0;
```

*Figure 21*

```
e2sm_rc_control_style_e ctrl_style
=E2SM_RC_CONTROL_STYLE_RADIO_RSC_ALLOC_CONTROL;
uint32_t ctrl_action = 8;   // Scheduling_Policy_Control. This is a
customized action beyond current ORAN spec.
```

*Figure 22*

```
e2sm_rc_param_value_t        *ctrl_param;
uint16_t                              ctrl_param_len = 2 (for policy
removal) or 4 (for policy add/update);
```

*Figure 23*

```
param_id = 100;    // policy group id
param_value:
union {
e2sm_rc_ran_param_value_t        nokey_element;
...
} value;
e2sm_rc_ran_param_type_e param_type = E2SM_RC_RAN_PARAM_TYPE_FALSE;
setting of nokey_element:
union {
uint32_t val_int = policy_group_id;   // can be edge user group id or cell
beam id.
...
} value;
e2sm_rc_ran_param_val_type_e value_type = E2SM_RC_RAN_PARAM_VAL_TYPE_INT;
```

*Figure 24*

```
param_id = 101;    // policy action
param_value:
union {
e2sm_rc_ran_param_value_t        nokey_element;
...
} value;
e2sm_rc_ran_param_type_e param_type = E2SM_RC_RAN_PARAM_TYPE_FALSE;
setting of nokey_element:
union {
uint32_t val_int = policy_action << 1 + policy_type;     policy_action = 0:
removal; 1: add/update;  policy_type = 0: allowance; 1: blocking
...
} value;
e2sm_rc_ran_param_val_type_e value_type = E2SM_RC_RAN_PARAM_VAL_TYPE_INT;
```

*Figure 25*

```
param_id = 102;    // tti-segment policy
param_value:
union {
e2sm_rc_ran_param_value_t        nokey_element;
...
} value;
e2sm_rc_ran_param_type_e param_type = E2SM_RC_RAN_PARAM_TYPE_FALSE;
setting of nokey_element:
union {
uint32_t val_int = cycle << 8 + offset;
...
} value;
e2sm_rc_ran_param_val_type_e value_type = E2SM_RC_RAN_PARAM_VAL_TYPE_INT;
```

*Figure 26*

```
param_id = 103;    // rbg-region policy
param_value:
union {
e2sm_rc_ran_param_value_t        nokey_element;
...
} value;
e2sm_rc_ran_param_type_e param_type = E2SM_RC_RAN_PARAM_TYPE_FALSE;
setting of nokey_element:
union {
uint32_t val_int = start << 10 + end;
...
} value;
e2sm_rc_ran_param_val_type_e value_type = E2SM_RC_RAN_PARAM_VAL_TYPE_INT;
```

*Figure 27*

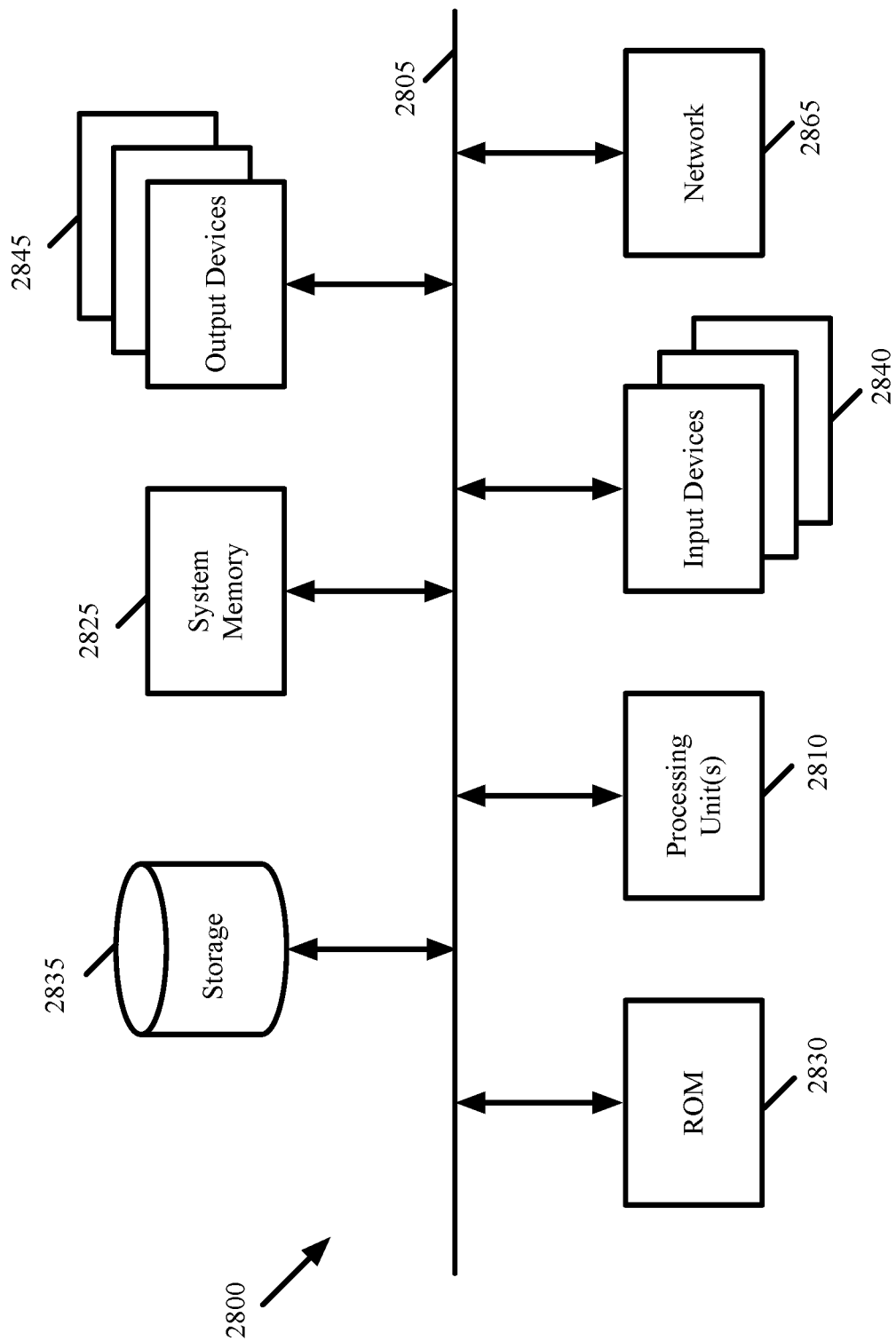

RAN APPLICATIONS FOR INTER-CELL INTERFERENCE MITIGATION FOR MASSIVE MIMO IN A RAN

BACKGROUND

Today, with massive MIMO, air interference transmission uses beam-forming to achieve higher data rate and extended coverage. However, a beam-formed transmission can cause bursty and sharp interference when the transmissions collide in direction from different cells. Such interference leads to packet reception failures and causes performance degradation, especially for traffic with high reliability and/or low latency requirements, such as URLLC. Current solutions include retransmitting packets in the MAC-HARQ or RLC layer to recover from the packet reception failures, which causes packet delay and statistical performance gain by chance, or using partial frequency re-use to limit each cell's transmission or receiving bandwidth in high interference neighborhoods, which is not aware of traffic and interference situations, thus causing resource waste as each cell operates independently, and which causes overall system capacity degradation due to low frequency resource utilization.

BRIEF SUMMARY

Some embodiments of the invention provide a method for an inter-cell interference management RAN (Radio Access Network) application (e.g., xApp) deployed across multiple RICs (RAN intelligent controllers) (e.g., centralized RICs (cRICs) and distributed RICs (dRICs)) configured for managing inter-cell interference in a RAN using the multi-base station performance visibility allowed by the RIC ecosystem. The RAN, in some embodiments, is an O-RAN (open RAN). User and traffic reports are collected from the base stations (e.g., cell towers) and, in some embodiments, these user and traffic reports include user RF conditions, serving beam directions, user traffic demand, and user allocated resources and achieved performances.

Based on data analytics from the user and traffic reports, the xApp determines the resource need for users in edges (i.e., areas near the boundaries between cells) toward different neighbor edges. For each edge, the RIC determines the neighbor cell and the beam direction that causes the top interference and determines a resource allocation policy for each edge and delivers it to each base station. Each base station then enforces the policy through the air interface packet scheduler.

In some embodiments, two types of policies are created. The first type, in some embodiments, is an allowance policy (also referred to herein as a preference policy). Allowance policies, in some embodiments, are applicable to edge users and specify the time and frequency resource that the base station scheduler is only allowed or should prefer to allocate to a specific group of users (i.e., the edge users). The second type, in some embodiments, is a blocking policy (also referred to herein as an avoidance policy). In some embodiments, blocking policies are applicable to all users within a serving beam direction and specify the time and frequency resource(s) that the base station scheduler is blocked or should avoid allocating to a specific group of users (i.e., the users within a beam serving direction).

The inter-cell interference management RAN application breaks the boundary of RAN nodes (e.g., CU (centralized unit) or DU (distributed unit)) to allow cluster-level performance observation and resource coordination, while also having architectural and performance advantages over existing RAN node-based solutions, according to some embodiments. Because the inter-cell interference management RAN application is external to the RAN nodes, it provides design flexibility to fit different operators' business needs without requiring continuous RAN software changes and customizations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIGS. 4A-4B conceptually illustrate a set of processes performed in some embodiments for identifying UE groups and policies for the UE groups.

FIG. 12 illustrates an example of an E2SM-KPM SubscriptionRequest of some embodiments.

FIG. 13 illustrates an example of a corresponding indication message of some embodiments that uses e2sm_kpm_ind_msg_format_3_t.

FIG. 14 illustrates an example of the setting of ue_meas_list for each user.

FIG. 15 illustrates an example of some embodiments of the setting of meas_data_list.

FIG. 16 illustrates an example of some embodiments of the setting of record_list for prb: 1 record.

FIG. 17 illustrates an example of some embodiments of the setting of record_list for throughput: 1 record.

FIG. 18 illustrates an example of so of the setting of e2sm_rc_ctrl_hdr_t.

FIG. 19 illustrates an example of the setting of e2sm_rc_ctrl_msg_t, in some embodiments.

FIG. 20 illustrates an example of some embodiments of the setting of 2nd ctrl_param.

FIG. 21 illustrates an example of some embodiments of the setting of e2sm_rc_ctrl_hdr_t.

FIG. 22 illustrates an example of some embodiments of the setting of ctrl_action.

FIG. 23 illustrates an example of some embodiments of the setting of e2sm_rc_ctrl_msg_t.

FIG. 24 illustrates an example of some embodiments of the setting of $1^{st}$ ctrl_param.

FIG. 25 illustrates an example of some embodiments of the setting of $2^{nd}$ ctrl_param.

FIG. 26 illustrates an example of some embodiments of the setting of $3^{rd}$ ctrl_param (//only exist for policy add/update).

FIG. 27 illustrates an example of some embodiments of the setting of 4th ctrl_param.

FIG. 28 conceptually illustrates a computer system with which some embodiments of the invention are implemented.

DETAILED DESCRIPTION

Figure 1:
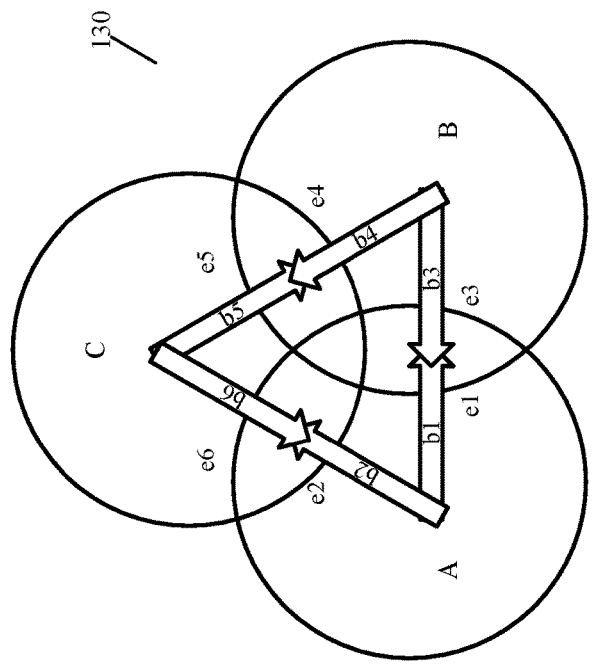
FIG. 1 conceptually illustrates an example 100 of 16 non-overlap interference mitigation policies of some embodiments created and allocated to different edge and beam groups for a set of three cells.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for an inter-cell interference management RAN (Radio Access Network) application (e.g., xApp) deployed across multiple RICs (RAN intelligent controllers) (e.g., centralized RICs (cRICs) and distributed RICs (dRICs)) configured for managing inter-cell interference in a RAN using the multi-base station performance visibility allowed by the RIC ecosystem. The RAN, in some embodiments, is an O-RAN (open RAN). User and traffic reports are collected from the base stations (e.g., cell towers) and, in some embodiments, these user and traffic reports include user RF conditions, serving beam directions, user traffic demand, and user allocated resources and achieved performances.

Based on data analytics from the user and traffic reports, the xApp determines the resource need for users in edges (i.e., areas near the boundaries between cells) toward different neighbor edges. For each edge, the RIC determines the neighbor cell and the beam direction that causes the top interference and determines a resource allocation policy for each edge and delivers it to each base station. Each base station then enforces the policy through the air interface packet scheduler.

In some embodiments, two types of policies are created. The first type, in some embodiments, is an allowance policy (also referred to herein as a preference policy). Allowance policies, in some embodiments, are applicable to edge users and specify the time and frequency resource that the base station scheduler is only allowed or should prefer to allocate to a specific group of users (i.e., the edge users). The second type, in some embodiments, is a blocking policy (also referred to herein as an avoidance policy). In some embodiments, blocking policies are applicable to all users within a serving beam direction and specify the time and frequency resource(s) that the base station scheduler is blocked or should avoid allocating to a specific group of users (i.e., the users within a beam serving direction).

The allowance policies and blocking policies are assigned in pairs, in some embodiments, such that each allowance policy assigned to an edge has a corresponding blocking policy assigned to the beam that is causing interference for users at the edge. For instance, an allowance policy R1 allowing resource R1 to be utilized by users at an edge e1 of cell A will have a corresponding blocking policy R1 blocking resource R1 for any users within beam B2 of edge 2 of cell B. As a result, a small amount of resources are allowed for a small group of users near a boundary of a first cell, while the same small amount of resources are blocked for a larger group of users being served by a particular beam of a second cell that is causing interference for the users near the boundary of the first cell (e.g., edge users can use 1 out of 20 resources, while users within the interfering beam are blocked from 1 out of 20 resources while still being able to use the remaining 19 resources). Each resource, in some embodiments, is a frequency time block. The frequency time blocks of some embodiments are compatible with, and determined by, the standards for 4G, 5G, and LTE such that the frequency time blocks can be divided into smaller frequency time blocks.

The inter-cell interference management RAN application breaks the boundary of RAN nodes (e.g., CU (centralized unit) or DU (distributed unit)) to allow cluster-level performance observation and resource coordination, while also having architectural and performance advantages over existing RAN node-based solutions, according to some embodiments. Because the inter-cell interference management RAN application is external to the RAN nodes, it provides design flexibility to fit different operators' business needs without requiring continuous RAN software changes and customizations.

FIG. 1 conceptually illustrates an example 100 of interference mitigation policies of some embodiments that are created for and allocated to different edge and beam groups identified for a set of three cells in a RAN. As shown, the interference mitigation policies in the example 100 include 16 non-overlap interference mitigation policies for the three cells (i.e., cells A, B, and C) illustrated. The interference mitigation policies in the example 100 are based on assumptions that resource need is normalized against total traffic need of 100% for the whole cell, and that 20 non-overlap time and frequency resource R1 to R20 are created and available for allocation.

As illustrated, a first table 110 identifies each edge area of each cell, the resource needed (as a percentage) for each edge area, and the top interferer and beam direction for each edge area. The example 100 also includes a second table 120 that specifies allowance and/or avoidance (i.e., blocking) polices for each cell A-C, and the edge areas or beam directions for which the allowance and/or blocking policies are specified. Additionally, a diagram 130 conceptually illustrates the three cells A, B, and C, as well as the edge areas e1-e6 in the three cells, and the beam directions b1-b6 in each of the cells.

Each beam direction b1-b6 can represent one or more beams transmitted by a base station and directed at users within the area covered by the beam directions b1-b6. In some embodiments, beams are dedicated per-UE, or per-cell. As long as a beam is directed to a certain geographic direction, in some embodiments, the beam is regarded as belonging to a particular beam grid. In some embodiments, each beam grid corresponds to a beam direction (i.e., each beam direction b1-b6 is representative of a particular beam grid). Also, in some embodiments, the beam directions b1-b6 are beam grid identifiers (i.e., b1 is an identifier for beam grid 1, b2 is an identifier for beam grid 2, etc.). While policies that are defined for edges are applicable only to UEs that are considered edge devices, the policies defined for beam directions are applicable to any UEs serviced by any beams within the beam grid associated with the beam direction. In some embodiments, both allowance and blocking policies are applicable to UEs within the regions for which the policies are applied as well as UEs near these regions.

As shown in the table 110, for cell A, edge area e1 has a 10% resource need and has top interferer as cell B and beam direction as beam b3, while edge area e2 has 5% resource need and has top interferer as cell C and beam direction of beam b6. Based on this data, the table 120 shows that edge e1 of cell A is assigned allowance policies R1-R1, and its top interferer cell B is assigned avoidance policies R1-R2 for beam b3, while edge e2 of cell A is assigned interference policy R4, and its top interferer cell C is assigned avoidance policy R4 for beam b6.

For cell B, the table 110 shows that edge area e3 has a resource need of 0% and has top interferer as cell A and beam direction as beam b1, while edge area e4 has a 20% resource need and has top interferer as cell C and beam direction as beam b5. Based on this data, the table 120 shows that edge e3 of cell B does not have any defined allowance policies, and does not have any corresponding blocking policies for the beam direction of its top interferer, while edge e4 is assigned allowance policies R5-R8, and its top interferer cell C is assigned blocking policies R5-R8 for its beam direction beam b5.

Lastly, for cell C, the table 110 shows that the edge area e5 has a resource need of 10% and has top interferer as cell B and beam direction as beam b4, while edge are e6 also has a resource need of 10% and has top interferer as cell A and beam direction of beam b2. Based on this data, the table 120 shows that edge e5 is assigned allowance policies R10-R11, and its top interferer cell B is assigned blocking policies R10-R11 for its beam direction beam b4, while edge e6 is assigned allowance policies R15-R16, and its top interferer cell A is assigned blocking policies R15-R16 for its beam direction beam b2.

The allowance policies specify allowed resources that a base station can allocate to UEs to which the allowance policies are applicable, and the blocking policies specify blocked resources that a base station cannot allocate to UEs to which the blocking policies are applicable, according to some embodiments. In some embodiments, the resources are segmented frequency resources and/or segmented time-slot resources. The resources of some embodiments are segmented carrier resource units (SCRU), such as PRBs (physical resource blocks). Each RAN base station, in some embodiments, is a transceiver that sends signals along a range of frequencies to UEs, and to talk to the UEs, it segments the carrier frequencies in any number of ways (e.g., when implementing 5G, it uses 5G PRBs segmented in time and frequency).

Figure 2:
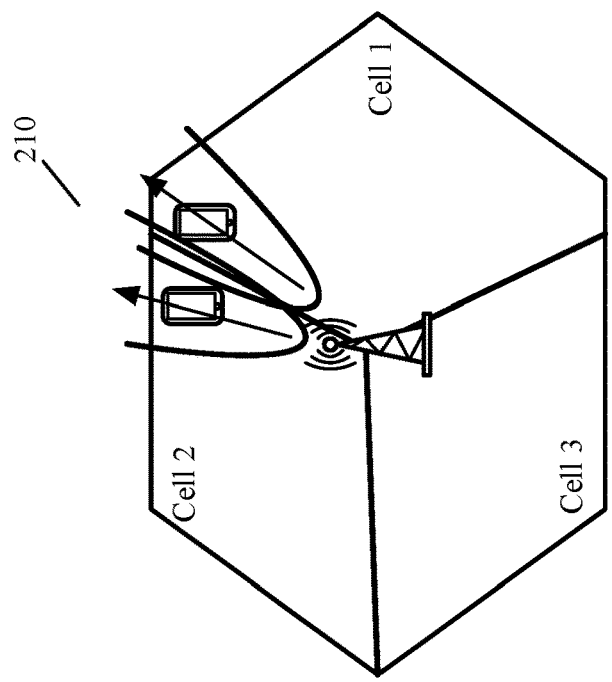
FIG. 2 conceptually illustrates two types of inter-cell interference of some embodiments.
Figure 2:
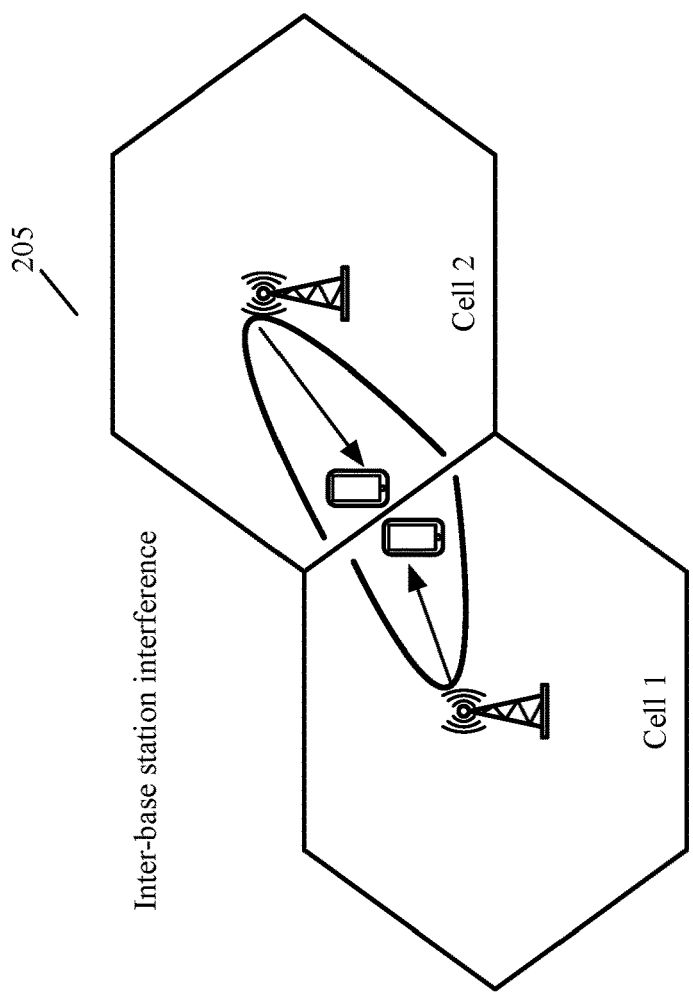

In some embodiments, there are two types of inter-cell interference, which are conceptually illustrated by FIG. 2. As shown, the first type of inter-cell interference 205 includes interference across distinct cells. This type of inter-cell interference 205 is referred to as inter-base station interference, in some embodiments, and occurs at the boundary between two distinct cells each having a base station in the center. The second type of inter-cell interference 210 includes interference across sector cells (i.e., different sectors served by the same base station). The second type of interference 210, in some embodiments, is referred to as inter-sector interference and occurs at the boundary between different sectors of a cell.

Figure 3:
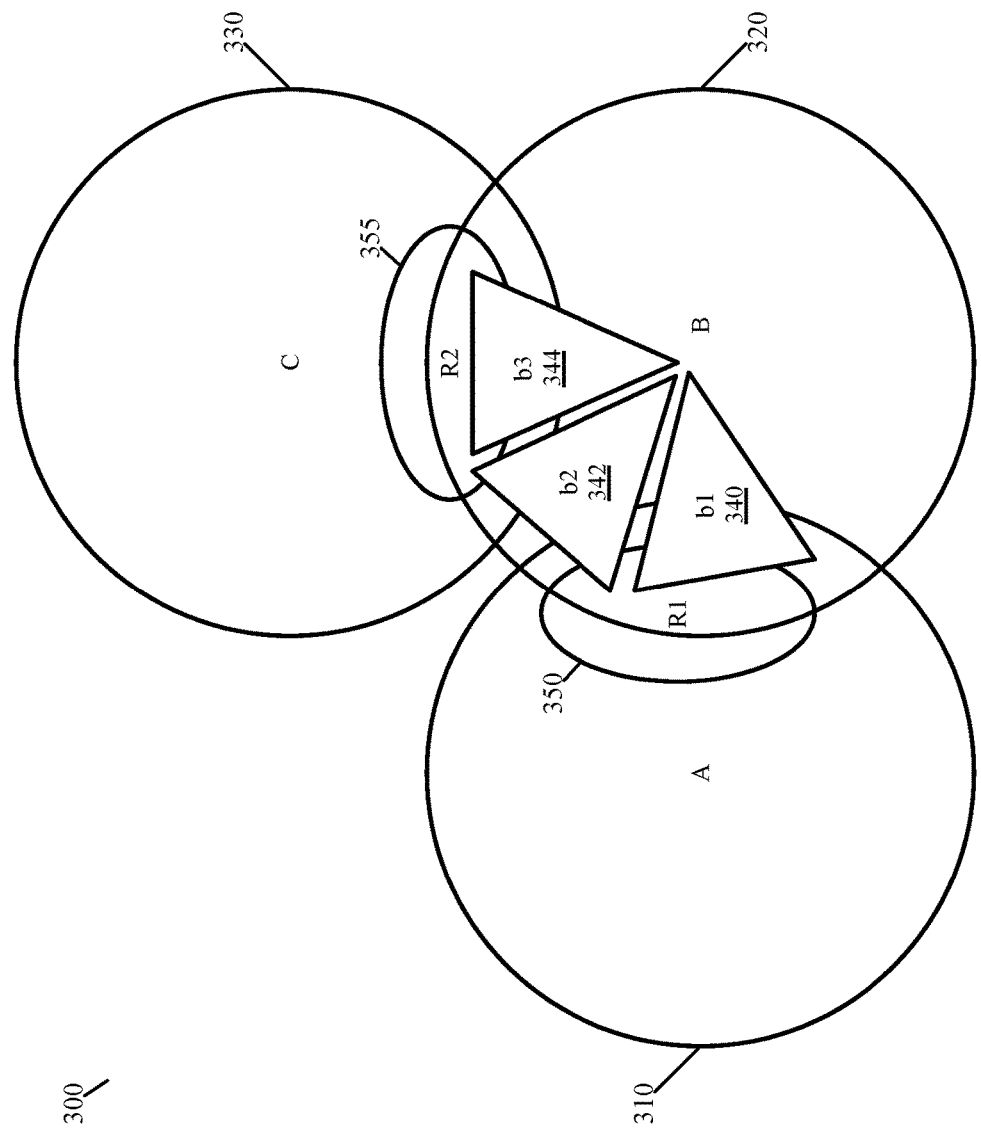
FIG. 3 conceptually illustrates a diagram that shows an example of some embodiments in which edge regions of cells are affected by interference from multiple beams transmitted by a base station of another cell, and in which a single beam causes interference for two different edge regions of two different cells.

In addition to the two types of inter-cell interference illustrated by FIG. 2, certain edge regions of some embodiments can experience interference from more than one beam, an a single beam can cause interference for two different edge regions. For example, FIG. 3 conceptually illustrates a diagram 300 that shows an example of some embodiments in which edge regions of cells are affected by interference from multiple beams transmitted by a base station of another cell, and in which a single beam causes interference for two different edge regions of two different cells.

As illustrated, the diagram 300 includes cell A 310, cell B 320, and cell C 330. Cell A 310 includes an edge region R1 350 that overlaps with cell B 320, and cell C 330 includes an edge region R2 355 that overlaps with cell B 320. Additionally, cell B 320 includes three beams b1 340, b2 342, and b3 344. The edge region R1 350 of cell A 310 experiences interference from beams b1 340 and b2 342 of cell B 320, and the edge region R2 355 of cell C 330 experiences interference from beams b2 342 and b3 344 of cell B 320.

Blocking policies of some embodiments are defined for each aggressing beam, and, in some embodiments, result in more than one blocking policy being defined for a particular beam. For instance, because the beam b2 342 causes interference for both edge region R1 350 and R2 355 in the diagram 300, two different blocking policies are defined for the beam b2 342, according to some embodiments. In other embodiments, a single blocking policy that takes each area of interference into account is defined for such an interfering beam. Since beams b1 340 and b3 344 each only interfere with a single edge region, a blocking policy for beam b1 340 only needs to consider the need of region R1 350, and a blocking policy for beam b3 344 only needs to consider the need of region R2 355.

While the example illustrated by the diagram 300 includes edge regions affected by one or two interfering beams, other embodiments include instances in which an edge region is affected by more than two beams. In some such other embodiments, the more than two beams can include more than two beams from a single interfering cell (e.g., two or more beams of cell B 320 affecting the region R1 350 of cell A 310), and/or more than two beams from multiple interfering cells. The multiple interfering cells of some embodiments can include both cells serviced by other beams and cells serviced by the same beam (e.g., inter-base station interference and/or inter-sector interference).

In some embodiments, the allowance and blocking policies are defined by an inter-cell interference RAN application. The inter-cell interference management RAN application of some embodiments is a Massive MIMO (mMIMO)

xApp that helps reduce inter-cell interference, improve multi-cell coordination (e.g., resource coordination across multiple base stations serving different areas), and increase overall network throughput. To test and verify such an xApp with a RAN, some embodiments use a test L2 simulator that is built with multiple CUs/DUs and that generates the user traffic to feed to the xApp. The test L2 simulator, in some embodiments, implements a custom scheduler logic that takes xApp policies into account. The L2 simulator is integrated with testE2node, in some embodiments, and the xApp is integrated with the L2 simulator.

The xApp serves an important role in the radio access network (RAN) and brings new capabilities to O-RAN that is not possible with traditional "closed" RAN infrastructure, according to some embodiments. To design such xApps, in some embodiments, certain guiding principles are followed. For example, CU/DU has limited visibility of RAN operation and performance. It acts on a fast real-time basis with limited information about the system. For instance, the MIMO beamformer only sees the current channel estimate to design a beamforming vector with a predefined set of rules for all situations and scenarios. In contrast, the RIC knows the context and prior information to optimize what beamforming algorithm to use, or which users to group together for MIMO, etc. Other data, in some embodiments, such as external information (e.g., GPS data, radar data, etc.), application server information, or information from map-rApps non-RT processing is also obtained. Some complex AI/ML models require heavy computation to make useful inference. As CU/DU has limited computation and storage capabilities, the RIC performs most of the non-RT or near-RT computations, such as model training, storage, and monitoring, according to some embodiments. The operational RAN is monitored in some embodiments to detect potential misconfigurations and performance bottlenecks, and for outage analysis through cloud software without invading the operational RAN.

Massive MIMO is seen as one of the key technologies for 5G. Due to the multi-antenna transmission and reception, this technology can inherently to provide diversity and improve capacity by targeting high gain antenna beams towards one or multiple subscribers, thus improving the receive power levels and spatially filtering the interference from neighboring subscribers and transmission points. In addition, a spatial multiplexing operations regime can improve the network capacity by transferring multiple data streams toward/from one or different subscribers utilizing a spatial re-use of the scarce time/frequency resource blocks, in some embodiments. Further advantages of some embodiments include the controlling of electromagnetic (EM) emissions or advanced network management technologies, like beam shaping, beam-based load balancing, optimized beam mobility, adaptive cell coverage areas, especially in highly dense urban 3D environments, and mobile subscribers. In order to further optimize networks, (e.g., maximize spectral efficiency, optimize coverage, or maximize cell capacity) fully digital beamforming (BF) methods are employed in some embodiments for below 6 GHz frequency wireless telecommunications. Grid of Beams (GoB) is a BF method which aims at selectively covering regions of interest with a suitable subset of radio beams (chosen from a dictionary of possible beams), in some embodiments.

The Massive MIMO xApp is split into two separate applications, in some embodiments. The first xApp is an inference application that helps in understanding the RAN environment and creates interference maps. The second xApp is an interference management application that takes the user traffic to decide operational policies in near-real time.

The goal of the inference application (i.e., the first xApp) is to create an interference map of the wireless infrastructure, in some embodiments. Interference maps show the location of base stations, in some embodiments, and spatial regions that are highly likely affected by interference from two or more nearby base stations. In some embodiments, creating interference maps is difficult because the base station does not report the interference value. The interference depends on the beams used at the base station or gNB—how much power the gNB radiates in different directions—for all calls, in some embodiments. It also depends, in some embodiments, on the environment—location of tall buildings or trees that affects the RF signal propagation—and appropriate path loss models.

In some embodiments, a coverage map that shows the coverage area of a base station in terms of received signal strength at all locations around the base station is generated. The coverage map, in some embodiments, depends on beams. Additionally, as mentioned above, an interference map that shows a large multi-cell area with overlapping regions of signal strength from multiple base stations is also generated. In some embodiments, the interference maps depends on a pair of beams (selected few). Interference cartography [IEEE'08] is used to create interference maps (e.g., power spectral density of PSD) for cognitive radios, in some embodiments. They use a spatial interpolation technique, in some embodiments, called kriging to fill the spatial gaps [IEEE'16 tutorial] on interference maps.

Input from the RAN, in some embodiments, includes base station locations, transmit power for all base stations, a dictionary of GoB beam patterns, CQI or path loss for each user, PMI for each user, and time advance for each user. In some embodiments, creating an interference map involves two stages. The first stage, in some embodiments, uses offline or external information and models to build initial interference maps. The locations of base stations are put on the map, and the map is divided into a 2-dimensional (2D) grid with appropriate resolution in the x and y axes. An RSS map is created assuming appropriate path loss model at the mid-band frequencies [3GPP TR38.901 v14 report], creating a spatially correlated shadow fading model [IEEE 05], defining a group of beams (GoB) for each base station, and creating a signal strengths (RSS) map per-base station, per-beam for each 2D location in the grid. An optional part of the first stage, in some embodiments, includes taking a 3D map (e.g., from Google Earth) of the geographical area and roughly calculating the shadowing attenuation factor for different zones. Lastly, the interface maps are created for each pair of beams.

In some embodiments, the second stage involves updating interference maps based on live network conditions. During this second stage, there is no need of user traffic, according to some embodiments. The base stations, in some embodiments, are asked to report path loss or calculate path loss from CQI. A path loss exponent and other shadowing parameters, in some embodiments, are estimated per-beam from CQI. In some embodiments, rough user location is estimated using PMI and CQI, and the interference map is updated based on per-user location and CQI information. Interpolation techniques such as "kriging" are used, in some embodiments, to extend interference maps to all locations.

The interference management application (i.e., the second xApp of the split Massive MIMO xApp), in some embodiments, is used to develop interference management policies based on the interference maps and user traffic information. In some embodiments, additional inputs from the RAN are utilized to develop the interference management policies. Such additional inputs, in some embodiments, include aggregate or per-user traffic patterns, volume, backlog, and timestamps.

In some embodiments, the interference management policies are developed using five steps. The first step, in some embodiments, is to identify "fat" users that are consuming large amount of data using per-user traffic (e.g., volume, backlog, throughput) information. The second step is to create user groups based on their rough location estimates, in some embodiments. The third step, in some embodiments, is to assign probability of interference to each user group using the interference maps. In some embodiments, the fourth step is to find a pair of beams that cannot be scheduled together at the same time-frequency block for each user group. Finally, the fifth step is to devise a set of restricted time-frequency resources that must be avoided by a base station for a particular user group or beam index, according to some embodiments.

The stage-2 application is implemented in Python, in some embodiments. A map class that creates regions based on distance and angle is defined, in some embodiments, for each base station. UE (user equipment) locations are estimated, in some embodiments, and coverage maps are created. For example, for each cell, at each map region, (1) new random distributions of UEs are created and the UEs report CQI and (2) the RSS value is updated for each map region. To create interference maps, in some embodiments, for each cell, at each map region, the set of cells that interfere are identified (e.g., a set of 2 or 3 cells) based on the coverage map. In some embodiments, an identifier is assigned to the region, referred to as a global region identifier, and includes cell, distance, and angle pairs. Not all pairs are interfering, in some embodiments, and as such, its chosen based on threshold. A binary file is then saved for the xApp, which includes the interference maps and pairs of cell-beam at each map region that interferes, in some embodiments.

In some embodiments, the xApp can then implement the following logic (Cpp). The goal, in some embodiments, is to simplify the xApp as much as possible by using file reading and table look-up only. First, UE location is estimated using beamid and CQI, in some embodiments, then, policy is created for each cell, according to some embodiments. For each cell, at each map region, in some embodiments, the set of UEs that are currently present in that region are identified. The UE's serving cell is then retrieved and orthogonal policies for these cell-beam pairs are implemented, in some embodiments.

FIGS. 4A-4B conceptually illustrate a set of processes performed in some embodiments for identifying UE groups and policies for the UE groups. The processes are performed, in some embodiments, by the mMIMO xApp. The first process 400 of FIG. 4A starts with a list of UEs, their serving cell ID, serving beam ID, and CQI. The process 400 moves (at 405) to the next user (or selects a first user in the list). The process 400 then determines (at 410) whether the user is an edge user (i.e., CQI<threshold). As mentioned above, edge users are identified using their CQIs and comparing those CQIs against a threshold. Users that have a CQI that is less than the specified threshold are considered edge users, while users that have a CQI that is greater than the specified threshold are not considered edge users.

When the user is not an edge user, the process 400 returns to 405 to move to the next user. Otherwise, when the user is an edge user, the process 400 transitions to assign (at 415) a UE group according to cell ID and beam ID. In some embodiments, the xApp performs this step by doing a table lookup. The process then transitions to output (at 420) a list of UE groups based on the table lookups. The process 400 then ends.

The process 402 of FIG. 4B starts with the outputted list of UE groups from the process 400, which includes cell ID and group ID. The process 402 moves (at 425) to the next user group (i.e., selects the next, or first, user group). The process 402 then gets (at 430) a potential interference cell (or group). In some embodiments, the xApp gets the potential interference cell using a table lookup. The process 402 then determines (at 435) whether an interference group exists for the current user group. In some embodiments, such as when no users are within a potential interference area, no interference group exists for the selected user group. When no interference group exists, the process 402 transitions to create (at 440) a new edge group and beam group policy.

When an interference group does exist, the process 402 transitions to determine (at 445) whether no policy exists for either the selected user group or the interference group. As mentioned above, policies include allowance policies and corresponding blocking policies. When the process 402 determines that policies are found to exist for either group, the process 402 transitions to determine (at 450) whether a policy exists for one group but not all groups. For example, a particular user group, in some embodiments, having a resource need of 0% will not have an assigned allowance policy or an assigned blocking policy, while an interference group identified for the particular user group is assigned a certain allowance policy. When no policies exist for any groups, the process 402 returns to 425 to move to the next user group.

When a policy exists for one group but not all, the process 402 transitions to handle (at 455) duplicate policy for the at least one group. The process 402 then outputs (at 460) policy for all UE groups. The process 402 ends following 460.

When the process 402 determines (at 445) that no policy exists for either groups, the process 402 transitions to create (at 465) a new orthogonal policy for both edge groups and corresponding beam groups. That is, for each edge group, an allowance policy is created, and for each interfering beam group, a corresponding blocking policy is created. The process 402 then determines (at 470) whether there are more user groups. When there are additional user groups, the process 402 returns to 425 to move to the next user group. When there are no more user groups, the process 402 transitions to output (at 460) policy for all UE groups. Following 460, the process 402 ends.

Figure 5:
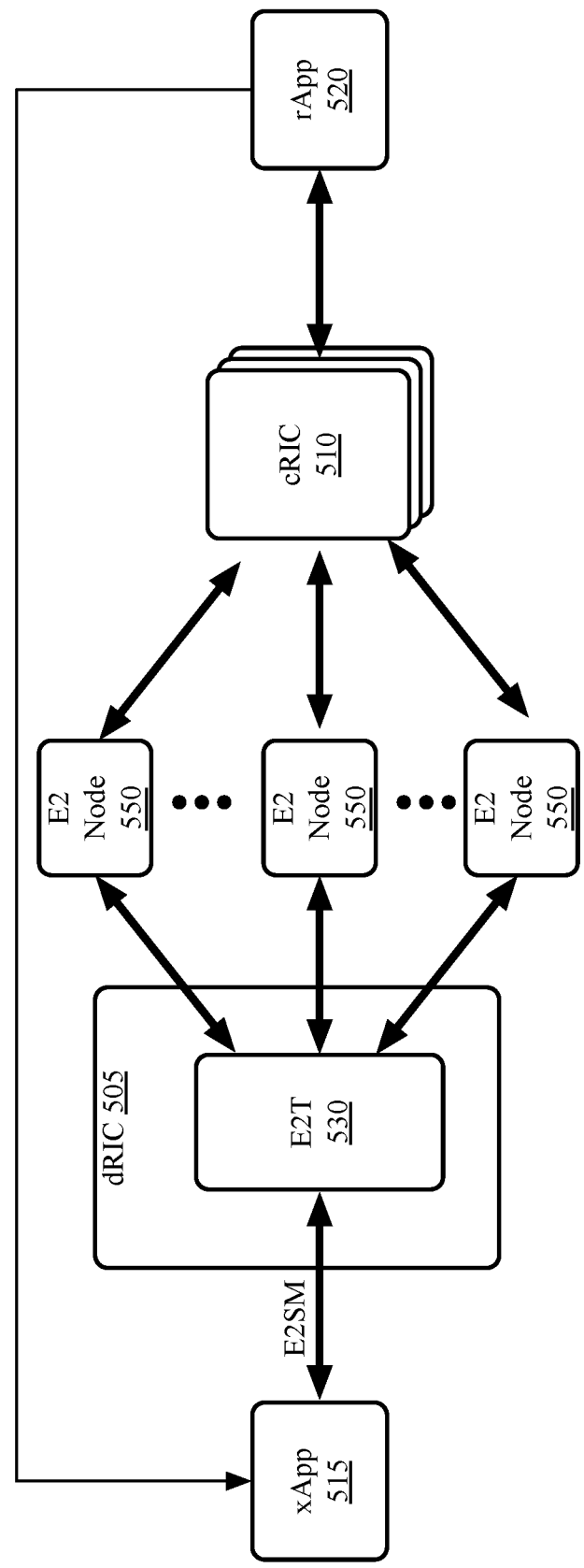
FIG. 5 conceptually illustrates a first example of an end-to-end block diagram of how the xApp is implemented, in some embodiments FIG. 6 conceptually illustrates a second example of an end-to-end block diagram of how the xApp is implemented, in some embodiments.

FIG. 5 conceptually illustrates a first example of a block diagram 500 of how the xApp is implemented, in some embodiments. As shown, the block diagram 500 includes a dRIC 505, cRICs 510, an xApp 515, an rApp 520, and multiple E2 nodes 550. The rApp 520 communicates with the E2 nodes 550 through the cRICs. Additionally, the dRIC 505 includes an E2T (E2 termination interface) 530 for connecting the E2 nodes 550 to the xApp 515 via the dRIC 505. In some embodiments, the xApp 515 and E2 nodes 550 communicate based on E2SMs (E2 service model), which are contracts between the xApp 515 and E2 nodes 550 that define function-specific protocols implemented on top of the general protocol, E2AP (E2 application protocol), through which the dRIC 510 and E2 nodes 550 communicate.

The E2T 530, in some embodiments, is a component of a datapath pod (not shown) of the dRIC 505. Because the E2T 530 is both a component of a datapath pod, in some embodiments, and an interface to the E2 nodes from the perspective of the RAN application (e.g., xApp), datapath pods of some embodiments are at times referred to as the E2T 530. In some embodiments, some or all datapath services provided by the dRIC 505 are embedded in a datapath thread and control thread of the datapath pod (e.g., E2T 530).

Each datapath thread, in some embodiments, provides fast datapath IO of the dRIC between E2 nodes and xApps. In some embodiments, data plane capabilities of the dRIC are scaled up by implementing the dRIC datapath IO with one control thread and multiple datapath threads that share the load for the datapath processing of the datapath pod (i.e., E2T 530). In other embodiments, each datapath thread has a corresponding control thread. The control thread or control threads, in some embodiments, performs several control operations associated with the dRIC's datapath.

The control thread(s) and datapath threads are separated by the dRIC, in some embodiments, because the data IO operations need to be fast and should not be slowed down by control operations that can operate at a slower rate. In some embodiments, the control and datapath threads are two threads in a single process (i.e., run in the same shared memory address space). The control thread(s) and datapath threads exchange data over two circular rings called cbuf, with one cbuf handling messages from the datapath thread to the control thread and the other handling messages from the control thread to the datapath thread, according to some embodiments.

The xApp 515 and rApp 520 make up the two-stage mMIMO application described above for understanding a RAN environment and defining operational policies in near-real time. The rApp 520, in some embodiments, is the inference application that receives input from the RAN (e.g., from the E2 nodes 550 via the cRIC(s) 510), and uses the input to create an interference map that identifies areas of interference (i.e., from overlapping carrier beams) in the RAN. The input from the RAN that the rApp 515 uses to create the interference map, in some embodiments, includes base station locations, transmit power for each base station, a dictionary of GoB (Grid of Beams) beam patterns, CQI or path loss for each UE (user equipment), PMI for each user, and time advance for each user.

While the diagram 500 illustrates the connection from the rApp 520 to the xApp 515 as an implied out-of-band communication, this connection is meant to be illustrative of the logical flow of data from the rApp 520 to the xApp 515. When the rApp 520 provides the interference map to the xApp 515, the communication goes from the rApp 520 to the cRIC 510, from the cRIC 510 to the dRIC 505, and from the dRIC 505 to the xApp 515.

The xApp 515, in some embodiments, is the interference management application that uses the interference map created by the rApp 520 to define interference management policies for implementation in the RAN (i.e., by the base stations). The xApp 515 receives the interference map from the rApp 520, and also receives additional input from the RAN (e.g., from the E2 nodes 550 via the E2T 530 of the dRIC 510), such as aggregate or per-user traffic patterns, volume, backlog, and timestamps, as also described above. Once the xApp 515 defines interference management policies for the RAN, the xApp 515 sends the interference management policies to the base stations via the E2 nodes 550 (i.e., through the E2T 530 of the dRIC 510), where the policies are implemented.

Figure 6:
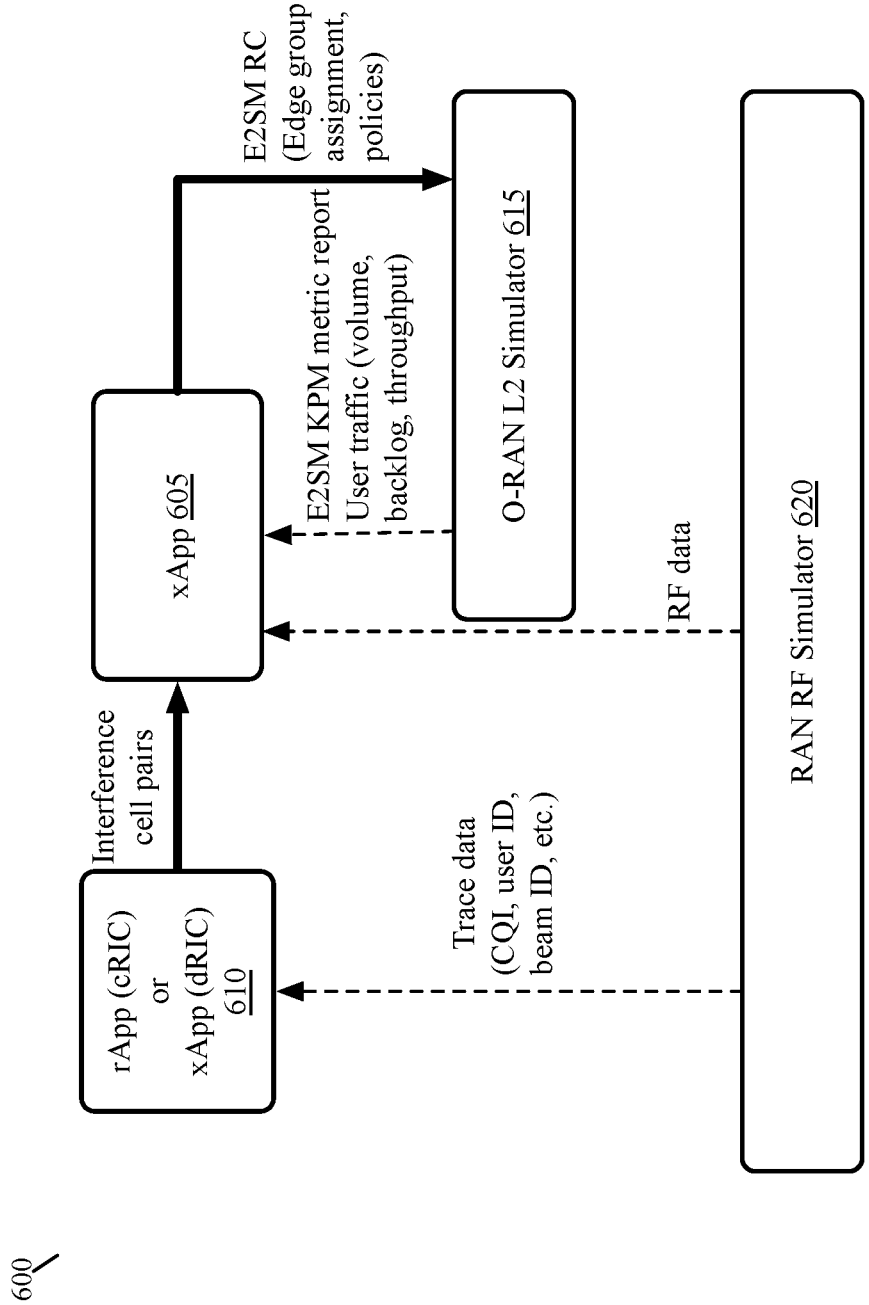

FIG. 6 conceptually illustrates an end-to-end block diagram 600 of how the xApp is implemented, in some embodiments. As shown, the block diagram 600 includes an xApp 605, an rApp 610, an O-RAN L2 simulator 615, and a RAN RF simulator 620. The rApp 610 and the xApp 605 exist in a pair in a closed-loop integration.

The rApp 610 is deployed by a cRIC (not shown), also referred to as a non-real-time RIC, according to some embodiments, and performs processes over a longer timescale (e.g., a few minutes, hours, etc.), and as such, is referred to as an offline application, in some embodiments. Also, in some embodiments, the rApp 610 can be an xApp deployed by a dRIC. The rApp 610 receives trace data that includes at least CQI, user ID, and beam ID from the RAN RF simulator 620. The rApp 610 uses this data to determine, e.g., locations of UEs for each cell (i.e., area around a base station) for which trace data is received, in order to identify interference cell pairs, such as the identified edges and top interferers described above for FIG. 1.

After identifying the interference cell pairs, the rApp 610 provides the identified interference cell pairs to the xApp 605. The xApp 605 is deployed by a dRIC (not shown), also referred to as a real-time, or near real-time RIC, according to some embodiments. As shown, in addition to the interference cell pairs received from the rApp 610, the xApp 605 also receives RF data from the RAN RF simulator 620, and E2SM KPM metric report regarding user traffic (e.g., volume, backlog, throughput, etc.) from the O-RAN L2 simulator 615.

Based on the data received from the rApp 610, RAN RF simulator 620, and the O-RAN L2 simulator 615, the xApp 605 generates edge group assignments and policies (i.e., allowance/blocking policy pairs) and provides these assignments and policies to the O-RAN L2 simulator 615 for implementation. Additional details regarding the L2 simulator will be described further below.

In some embodiments, frequency reuse is utilized for mitigating inter-cell interference. In this method, nearby cells use different frequency bands to avoid interference, in some embodiments. Typically, frequency reuse is used for SISO (single antenna) links, in some embodiments, because a single antenna base station would radiate the signal equally in all directions causing higher chances of interference in the same frequency bands. Beamforming creates opportunities to mitigate interference, according to some embodiments.

Distributed MIMO, is utilized, in some embodiments for mitigating inter-cell interference by letting multiple base stations coordinate with each other and simultaneously serve a single user through a distributed array of antennas. However, in some embodiments, this approach is not very practical as it requires a tight sync of both control and data channels among base stations with strict latency constraints.

In some embodiments, MU-MIMO directional beamforming, which uses MU-MIMO to create directional links with less interference to edge users, is used for inter-cell interference mitigation. User grouping and geolocation is used, in some such embodiments, to inform a base station scheduler to not serve a particular group for certain durations. In some embodiments, the xApp can adjust beamforming parameters dynamically based on user density, mobility patterns, day/night, etc.

Inter-cell coordination, which implements basic policies across cells dynamically, such as if cell 1 serves Edge user group A with frequency bands f1 then the cell2 should serve this direction with frequency band f2, is utilized for inter-cell interference mitigation in some embodiments. MU-MIMO, in some embodiments, allows different beamforming vectors for different directions. In some embodiments, the xApp configures frequency bands and beamforming sectors.

In some embodiments, for inter-cell interference mitigation, flexible codebook design (GoB based) is used. Codebook is a set of beamforming vectors that can be used for M-MIMO beamforming, in some embodiments. In codebook-based beamforming, rather than creating an arbitrary beamforming vector from channel measurements, the base station choses an appropriate beamforming vector from the codebook by just specifying a single integer-index or location of beamforming vector in the set, according to some embodiments. It reduces the feedback overhead in cellular network, in some embodiments, as the UE do not need to feedback the entire channel matrix, but only the PMI (Precoding matrix indicator) index. The xApp of some embodiments can configure the codebook. Wide-beams are used for low-density users and narrow beams for high density user groups, according to some embodiments.

In some embodiments, interference and RSSI maps are created based on beamforming and CQI feedback for inter-cell interference mitigation by finding regions of high interference, testing beamforming vectors that mitigates the interference well, observing the network, identifying corner cases and figuring out what works and what doesn't work in the network. A coverage map is generated, in some embodiments, with dependency on beamforming ID. In some embodiments, this could be an rApp for a non-RT application. The xApp, in some embodiments can do short term interference prediction.

As a first use case, MU-MIMO is a key technology of some embodiments for 5G to improve spectral efficiency-serving more users within limited spectrum by using multiple antennas and RF chain hardware. The performance of MU-MIMO, in some embodiments, depends heavily on the quality of RF environment or channel between the base station and the users. In some embodiments, some users have better channel than others for better MU-MIMO performance. It's critical and challenging to identify such users so that the overall system throughput can be maximized, according to some embodiments.

As a solution, in some embodiments, user selection techniques are used to find the best set of users to serve in a timeslot. Given the channel estimates of all available users, user selection methods identify those users whose channel vectors are least correlated with each other, in some embodiments, so that an independent uncorrelated stream can be created for each user. Most algorithms are greedy to find a suboptimal solution since the problem is NP-hard and an exhaustive search would take forever to solve, in some embodiments.

Figure 7:
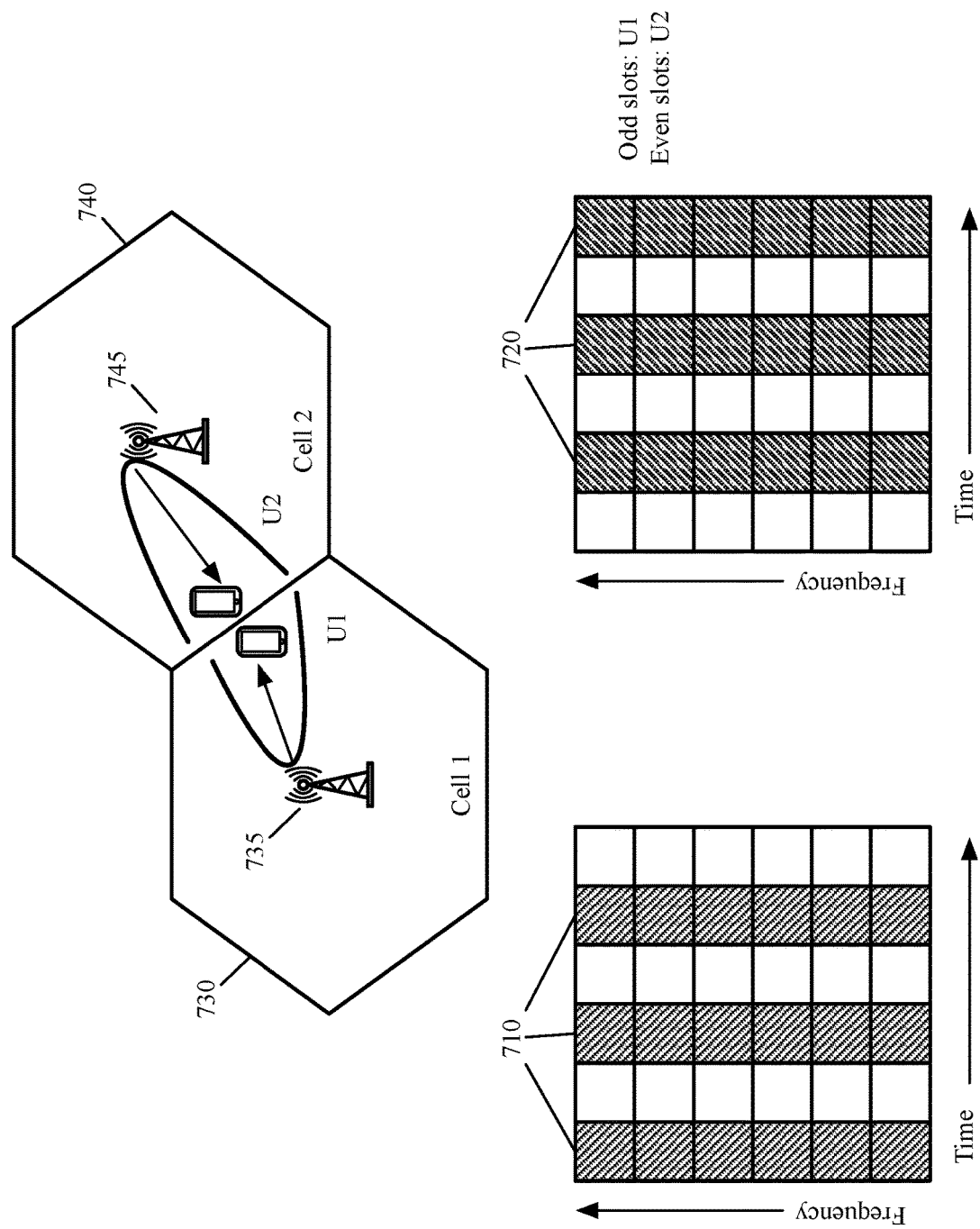
FIG. 7 conceptually illustrates two-cell coordination in which orthogonal time resources are allocated by the mMIMO xApp of some embodiments to two interfering users.

For example, FIG. 7 conceptually illustrates two-cell coordination in which orthogonal time resources are allocated by the mMIMO xApp of some embodiments to two interfering users. As shown, cell 1 730 includes a base station 735 and at least one user U1, while cell 2 740 includes a base station 745 and at least one user U2. In this example, odd columns 710 of the time frequency blocks are assigned to user(s) U1 of cell 1 730, while even slots 720 of the time frequency blocks are assigned to user(s) U2 of cell 2 740.

The input from RAN, in some embodiments, includes SRS or BF weights and MAC scheduling decisions in the past. It should be noted that SRS requires L1 IQ data. The output to RAN, in some embodiments, is a set of users for MU-MIMO in each scheduling slot.

As a second use case, of some embodiments, sounding reference signals (SRS) are uplink signals that are transmitted by each UE over some dedicated time-frequency resources. These are the only uplink reference signals that cover the entire spectrum bandwidth of the BS even though each UE may communicate on a fraction of this bandwidth, in some embodiments. SRS channel estimates are used in some embodiments to determine which frequency band is good to schedule the particular UE as some other band may be severely attenuated due to wireless fading channel. In some embodiments, the main challenge is to scale the SRS resource allocation to hundreds of users over non-overlapping time/frequency/code blocks with appropriate periodicity in time and comb structure in frequency.

Based on the contextual information from each user, the xApp of some embodiments can evaluate which user needs SRS resources and which user won't need them. Also, depending on the need, the SRS configuration can be updated over a large timescale, in some embodiments. In some embodiments, user mobility affects the best SRS configuration. For instance, in some embodiments, a user at the edge may need more SRS resources than a nearby user so that the SRS channel estimates are good and reliable for the edge user. In some embodiments, SRS configuration include updating three parameters: bandwidth, comb-structure and periodicity for each user. If CDMA is used, in some embodiments, then code for particular UEs. In some embodiments, it is not recommended to update SRS very frequently, so evaluate if there is really any need to update the SRS which can help in long term with infrequent updates.

The input, in some embodiments, includes SRS configuration from all users' traffic information and RF conditions to infer geolocation. The output, in some embodiments, is SRS configuration and when to change SRS configuration.

Figure 8:
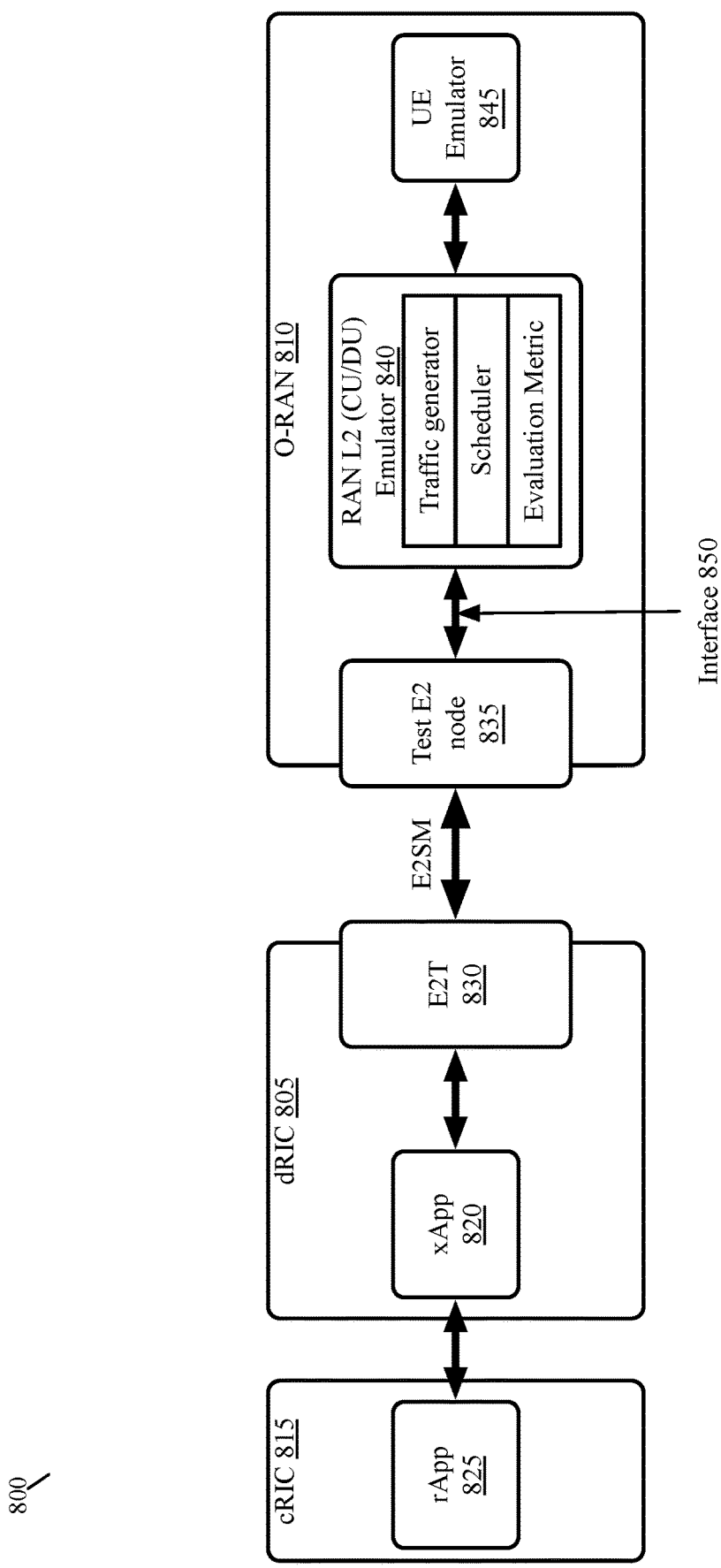
FIG. 8 conceptually illustrates a block diagram of some embodiments showing an end-to-end implementation for mMimo xApp and integration of dRIC and O-RAN.

FIG. 8 conceptually illustrates a block diagram 800 of some embodiments showing an end-to-end implementation for mMimo xApp and integration of dRIC and O-RAN. The O-RAN of some embodiments consists of a bare-minimum DU and corresponding UE side implementation in C for close-loop integration. As shown, the block diagram 800 includes an rApp 825 deployed by a cRIC 815, an xApp 820 and E2T 830 deployed by a dRIC 805, and an O-RAN that includes a test E2 node 835, a RAN L2 emulator 840, and a UE emulator 845. Additionally, an interface 850 is implemented between the test E2 node 835 and the RAN L2 simulator 840.

The rApp 825 and xApp 820 perform the same operations in the field (i.e., not only when performing operations as part of the simulation) for the rApp to generate regions (i.e., cells) of interference and for the xApp to identify policy pairs for these regions and provide these policies to the actual RAN base station components (e2 node components). In such cases, the rApp and/or xApp collect the data from the RAN base station components through the cRIC and/or dRIC components, and then use this collected data to identify the interference regions and generate the resource allocation policies (i.e., the allow/block policies).

Figure 9:
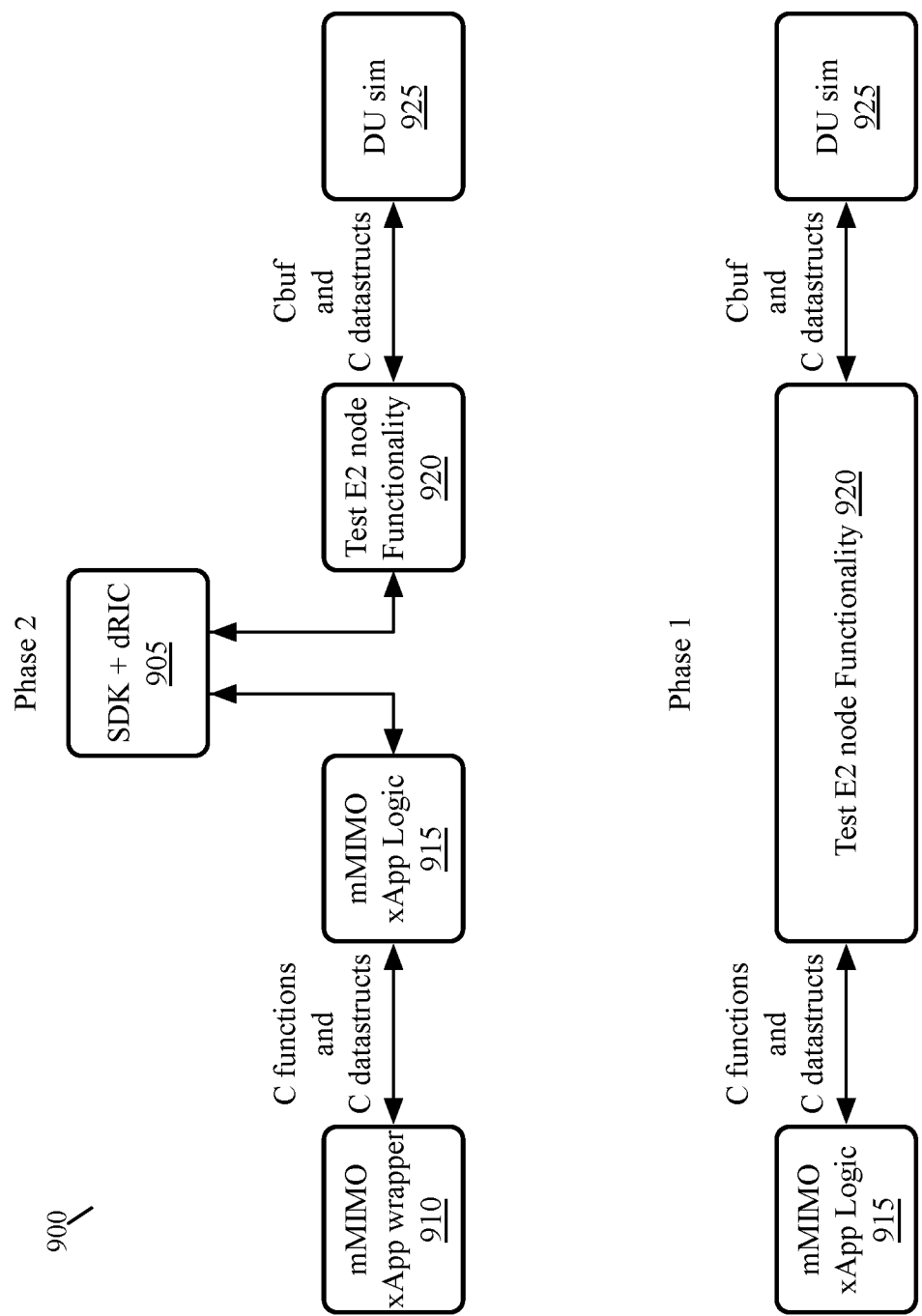
FIG. 9 conceptually illustrates a block diagram of the code blocks, of some embodiments, during phase 2 and phase 1.

FIG. 9 conceptually illustrates a block diagram of the code blocks, of some embodiments, during phase 2 and phase 1. These code blocks, in some embodiments, include mMIMO xApp logic 915, mMIMO xApp wrapper 910, test E2 node 920, and an L2 simulator 925. The mMIMO xApp logic 915, in some embodiments, is the core logic of what the xApp needs to do. The mMIMO xApp wrapper 910 interfaces with other ORAN endpoints (not shown) and triggers the core logic, in some embodiments. The status, in some embodiments, does not exist. The test E2 node 920, in some embodiments, includes RC and KPM ranfunctions and passes information over cbuf (not shown). Lastly, the L2 simulator 925, of some embodiments, performs E2SM decoding and scheduling logic.

The interfaces included in some embodiments are a functional interface between "mMIMO xApp Logic" and "mMIMO xApp wrapper", interfaces from "mMIMO xApp wrapper" to SDK 905, SDK to dRIC, dRIC 905 to E2node are already defined, and an interface from test E2 node 920 to L2 simulator 925, which is the cbuf and is already defined (i.e., not merged to master).

In some embodiments, similar to the Porto xApp, the payloads from the DU are integrated and sent to the xApp (i.e., as an indication message) and policy information is provided from the xApp to the DU using E2SM RC (RAN control) service model. The indication message from the RAN to the RIC specifies to load all information mentioned previously from RAN in an appropriate format. The E2SM RC from the RIC to the RAN is not a standard-compliant RAN control message, but is useful for xApp demonstration, in some embodiments. It can use the existing E2SM RC implementation in some embodiments with minor variations.

The L2 DU simulator 925 of some embodiments performs functionality including that of an L2 scheduler that allocates time-frequency-space resources (technically called PRB or physical resource blocks) for all users in the cell. For the initial implementation, in some embodiments, a simple packet level round-robin (RR) scheduler can be used. More sophisticated mechanisms such as QoS weighted RR, or proportional fair (PF) can be added later if time permits, in some embodiments. For each scheduling TTI, the L2 scheduler gets the list of UEs that have data to send as input, in some embodiments, and outputs a list of scheduled UEs and per-scheduled UE, the PRB zone allocated. In some embodiments, the L2 RR scheduler maintains control parameters including a pointer to the last scheduled user.

Figure 10:
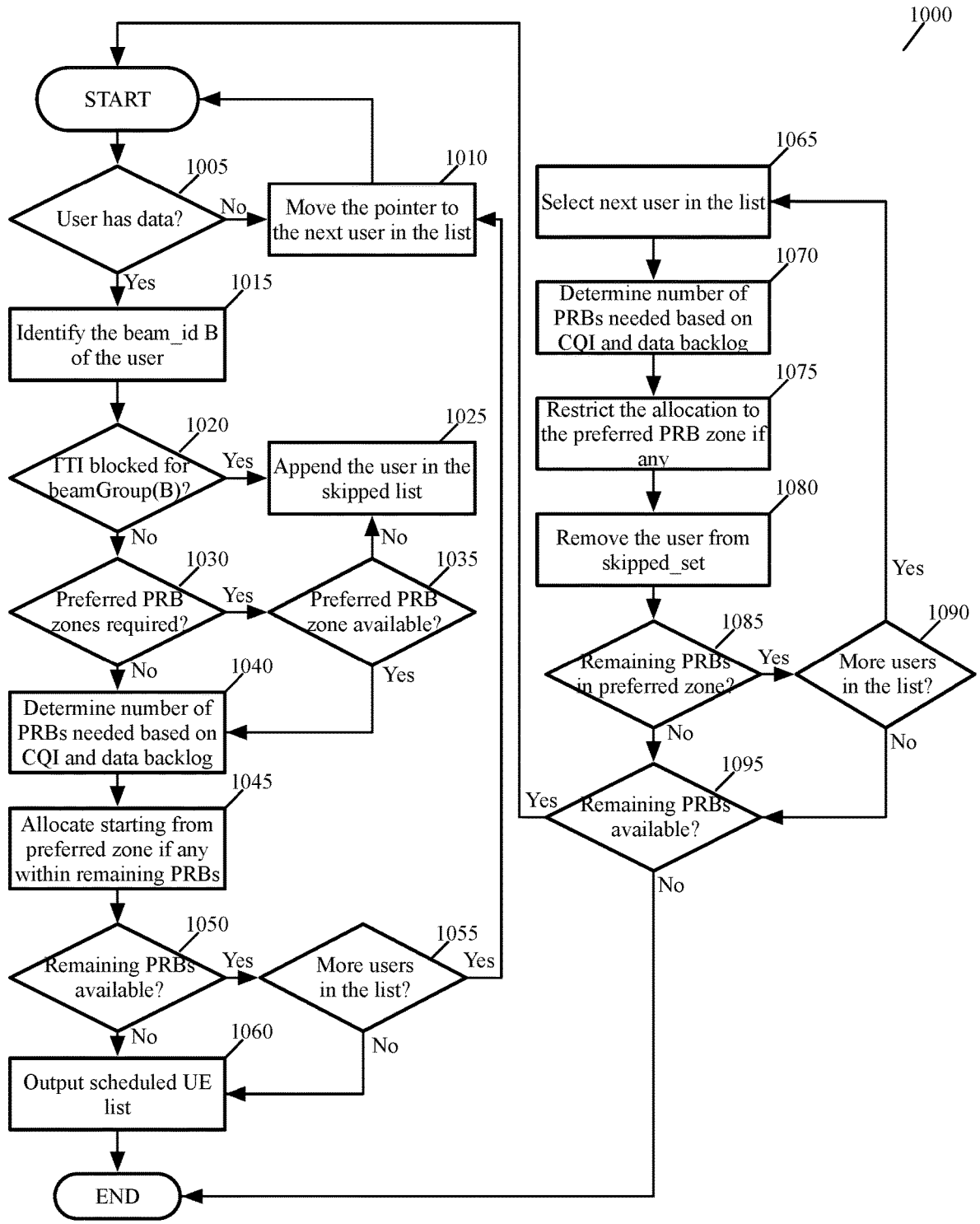
FIG. 10 illustrates a process performed by the L2 RR scheduler of some embodiments for implementing the L2 RR scheduler logic for scheduling.

FIG. 10 illustrates a process performed by the L2 RR scheduler of some embodiments for implementing the L2 RR scheduler logic for scheduling. In some embodiments, the process 1000 starts at 1005 when the process is starting from a current pointer of a regular list of scheduled UEs, while in other embodiments, the process 1000 starts at 1065 when the process is starting from the beginning of a skipped list. Both options will be described below.

When the process 1000 starts with the regular list, the process determines (at 1005) whether the user has data. When the user does not have data, the process transitions to 1010 to move the pointer to the next user in the list and returns to 1005. Otherwise, when the user does have data, the process 1000 transitions to identify (at 1015) the beam_id B of the user. The process 1000 then determines (at 1020) whether TTI (transmission time interval) is blocked for beam group B. When the TTI is blocked for beam group B, the process transitions to append (at 1025) the user in the skipped list.

Otherwise, when the TTI is not blocked for beam group B, the process 1020 transitions to determine (at 1030) whether preferred PRB zones are required. When preferred PRB zones are required, the process transitions to determine (at 1035) whether a preferred PRB zone is available. When the preferred PRB zone is not available, the process 1000 transitions to append (at 1025) the user in the skipped list. Otherwise, when the preferred PRB zone is available, the process 1000 transitions to determine (at 1040) the number of PRBs needed based on CQI and data backlog. When the process 1000 determines (at 1030) that preferred PRB zones are not required, the process also transitions to determine (at 1040) the number of PRBs needed based on CQI and data backlog.

After the number of PRBs needed based on CQI and data backlog is determined, the process 1000 allocates (at 1045) starting from the preferred zone (if any) within the remaining PRBs. The process 1000 the determines (at 1050) whether remaining PRBs are available. When there are remaining PRBs available, the process 1000 determines (at 1055) whether there are more users in the list. When the process 1000 determines that there are more users in the list, the process 1000 returns to the start at 1005. Otherwise, when the process determines there are no more users in the list, the process 1000 outputs (at 1060) a scheduled UE list. When the process alternatively determines (at 1050) that no remaining PRBs are available, the process outputs (at 1060) the scheduled UE list. Following 1060, the process 1000 ends.

When the process 1000 starts from the skipped list, the process 1000 begins by selecting (at 1065) the next user in the list. The next user, in some embodiments, is the first user in the skipped list. The process then determines (at 1070) the number of PRBs needed based on CQI and data backlog. The process 1000 then restricts (at 1075) the allocation to the preferred PRB zone (if any), and removes (at 1080) the user from the skipped_set.

Next, the process 1000 determines (at 1085) whether there are remaining PRBs in the preferred zone. When there are remaining PRBs in the preferred zone, the process transitions to determine (at 1090) whether there are more users in the skipped list. When there are more users in the skipped list, the process returns to 1065 to select the next user in the list. Otherwise, when there are no more users in the skipped list, the process transitions to determine (at 1095) whether there are any remaining PRBs available.

When the process determines (at 1085) that there are no remaining PRBs in the preferred zone, the process transitions to determine (at 1095) whether there are any remaining PRBs available. When there are remaining PRBs available, the process 1000 returns to the start of the regular list process described above by determining (at 1005) if the next user in the regular list has data. Otherwise, when the process determines (at 1095) that there are no remaining PRBs available, the process 1000 ends.

L2 User Backlog Tracking, in some embodiments, maintains the data backlog for each user. For the initial implementation, some embodiments assume all users have full-buffer traffic, and as such, there is no need to track L2 data backlog. In some embodiments, UE-level KPM reports generated for KPM metric reporting include CQI, beam identifier, UE throughput, and PRB used. A per-beam scheduling rule can be received from the RIC, in some embodiments, and enforced by the L2 scheduler. Each rule, in some embodiments, includes RAN parameters such as BeamID, which is mandatory and used to represent the UE-group, as well as PreferredPrbZoneStart/Stop, or BlockedPrbZoneStart/Stop, and PreferredTtiPattern, or BlockedPrbTtiPattern.

In some embodiments, in order to evaluate the inter-cell interference on each UE data transmission, the L2 simulator accesses all of the RF scheduler decisions. As a result, in some embodiments, all cells are placed in a single DU, which communicates with the dRIC through a single E2 interface, such as the interface 850 in the diagram 800 between the test E2 node 835 and the RAN L2 emulator 840.

In some embodiments, the test E2 node interfaces with the simulator, while in other embodiments, the test E2 node does not interface with the simulator. A provision of running the E2 node in standalone mode (e.g., standalone DU as it is today) is present, in some embodiments.

The L2 simulator of some embodiments is run as a separate thread from the existing two E2 node threads in the same binary. In some embodiments, two cbufs from test E2 node to L2 simulator, and each of these cbufs needs to be polled at a certain periodicity, according to some embodiments. Other mechanisms to interface these two modules are used, in some embodiments, such as SCTP or gRPC. However, cbuf is the easiest since it uses shared memory, according to some embodiments. In some embodiments, other approaches are utilized and the E2 node has to open up a new termination and implement additional server-client code. The test E2 node is the termination of E2 messages, in some embodiments.

Figure 11:
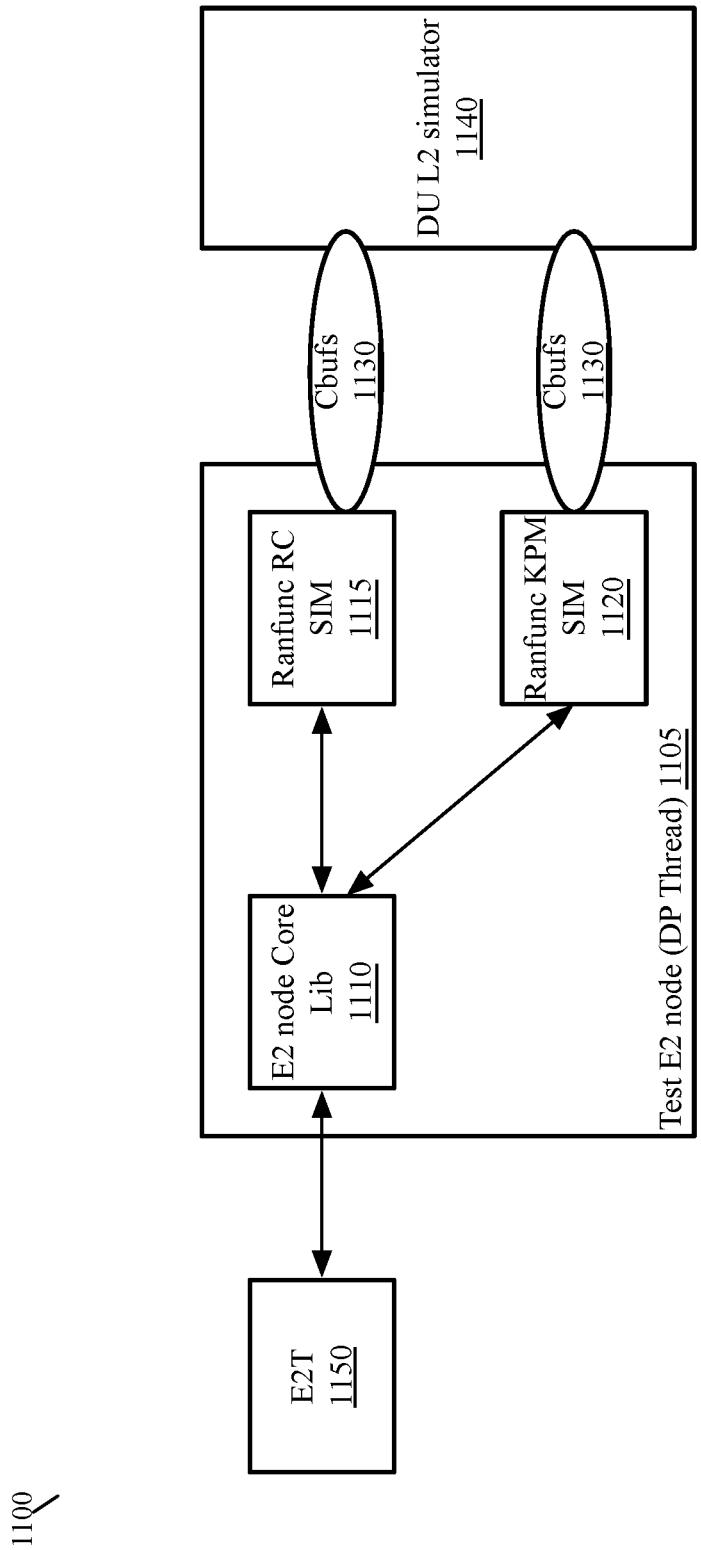
FIG. 11 conceptually illustrates a block diagram showing a workflow between the E2T, the test E2 node, and the DU L2 simulator, in some embodiments.

FIG. 11 conceptually illustrates a block diagram showing a workflow between the E2T 1150, the test E2 node 1105, and the DU L2 simulator 1140, in some embodiments. The test E2 node 1105 includes an E2 node core library 1110, a ranfunc RC simulator 1115, and a ranfunc KPM simulator 1120. The ranfunc simulators 1115 and 1120 interface with the L2 simulator 1140 via the cbufs 1130, as shown.

The workflow, in some embodiments, starts with the initialization of the test E2 node 1105 based on yaml files (i.e., based on the ranfunc in the yamls, init those handlers). For the L2 simulator 1140, the test E2 node 1105 reads a newly create yaml file that has two newly created ranfunc handlers, in some embodiments. These new ranfunc handlers, in some such embodiments, include RC SIM 1115 and KPM SIM 1120. In some embodiments, inside the initialization of these two ranfunc handlers, two cbufs are allocated for each, as illustrated. Next, the test E2 node 1105 (DU) is launched, in some embodiments. The L2 simulator 1140 is also launched in a separate thread with a reference to the cbufs 1130 created above, according to some embodiments.

In some embodiments, there are two design approaches. For the first design approach, in some embodiments, the ranfunc handler maintains E2SM termination and it terminates all the E2 messages. For indications, in some embodiments, the ranfunc maintains the timer. The L2 simulator keeps pushing metric reports to the cbuf, in some embodiments. When the timer fires, the ranfunc of some embodiments reads from the cbuf and constructs the indication report and sends it to dRIC. For the second design approach, the ranfunc handler, in some embodiments, forwards all the messages to L2 simulator. In some such embodiments, the DU L2 simulator needs a timer mechanism.

The message flow from the ranfunc handler to the L2 simulator, in some embodiments, includes the test E2 node sending an e2setup request to the dRIC with two ranfunc handlers, RC SIM and KPM SIM. The test E2 node receives an e2setup response from the dRIC, in some embodiments, and the test E2 node receives a subscription request from the dRIC. In some embodiments, there are two approaches to the subscription request.

The first option involves saving the subscription request with ranfunc handler, in some embodiments. Based on the indication periodicity, in some embodiments, every time the timer fires, it sends a request on the cbuf to L2 simulator to get the latest metric report. In some embodiments, the L2 simulator responds by putting the metric report on the cbuf. The ranfunc handler polls and reads from the cbuf, constructs the indication report and sends it to the dRIC, according to some embodiments.

The second option, in some embodiments, involves forwarding the subscription request to L2 simulator. In some such embodiments, the L2 simulator starts and maintains the timer. Every time the timer fires, the L2 simulator of some embodiments puts the latest metric report on the cbuf. In some embodiments, the ranfunc handler polls and reads from the cbuf, constructs the indication report and sends it to the dRIC.

In both options, the constructing of indication report as per E2SM-KPM codec logic remains with the ranfunc handler. The L2 simulator only provides the contents of the report, according to some embodiments. Finally, the test E2 node receives a control request from the dRIC and then sends a control response to the dRIC.

In some embodiments, a single indication message is sent per cell in each KPM period. Data needed to generate the indication are produced by the L2 simulator, in some embodiments, and conveyed via the CBUF, and the message is composed by the KPM sim in the test E2 node.

RC Control requests are sent to each cell, in some embodiments. Multiple control requests are sent, in some embodiments, to a single cell. In some embodiments, there is no periodical expectation on the control request receptions. Data are extracted from the control requests of some embodiments by the RC sim in the test E2 node and conveyed to the L2 simulator via the CBUF.

Because the L2 simulator code is in the same binary, it is deployed in the same E2 node-test container in the same pod, according to some embodiments. For launching E2 node with L2simulator the command line used is ./bazel-bin/E2 node/E2 node E2 node/config/du_12sim.yaml. The yaml du_12sim.yaml includes ranfuncs RC SIM and KPM SIM, in some embodiments. The yaml of some embodiments also points to a ue_data.bin for UE specific parameters.

The UE simulator 845 of some embodiments is responsible for interacting with the L2 DU simulator 840. It evaluates the actual traffic channel SINR based on the L2 scheduling outcome and estimates the achievable UE throughput, according to some embodiments.

The stage-2 App simulates aspects of UE including uniform placement of UE location (i.e., (x,y) coordinates), calculation of a long distance pathless model to each cell in the cluster, determination of the serving cell and the serving beam_ID of the user, addition of shadow margin, and determination of the CSI-RS SINR for CQI report.

To generate CQI, some embodiments use (1) Signal (dB): P+BeamAntGain (serving)-PL(serving)-Shadow (serving), (2) Noise Figure: 5 dB, (3) Interference: SUMneighbor{dB2Linear(P+AVGbeam {BeamAntGain (neighbor, beam)}-PL(neighbor)-Shadow(neighbor))}, (4) SINRcQI (dB)=Signal-linear2 dB(Noise+Interference), (5), SINR to CQI mapping table (TBA), and (6) for simplicity, only rank1 is considered (no SU-MIMO CQI).

In some embodiments, to ensure consistency between the UE RF reports and that used in the "offline" interference map produced by the stage-2 App, the stage-3 UE simulator does not simulate actual UEs. In some embodiments, as an alternative, certain UE information is read from files produced by stage-2 App such as number of UEs, number of cells, number of beams per cell, number of PRBs (or RBGs (i.e., PRB groups)) per cell, DL noise figure normalized against cell PDSCH power density, and per-UE information including serving cell id, serving beam id, CQI, and received signal strength from each cell, each beam Su(cell, beam).

With regard to dimensioning, assuming the cluster is composed of 7 gNBs, 3 sector/site, 4beams/sector, average 20users/sector, then (1) NbrCells=7×3=21 (1 cell=1 DU), (2) NbrUsers=7×3×20=420, (3) NbrBeams=7×3×4=84, (4) per UE info: 2B (serving cell id)+1B (serving beam id)+1B (cgi)+4×84B (signal array), and (5) total info: 420×340=142 KB. This is a fairly small file size, according to some embodiments. Even if the cluster is expanded to 2-tiers (i.e., 19 gNBs), the file size increases to 1 MB, which is still manageable, in some embodiments.

In some embodiments, the PDSCH SINR estimate when a UE is scheduled, $SINR_{PDSCH.u}=S_u(serving\_cell, serving\_beam\_id)-linear2dB(Noise+SUM_{\{neighbor\ cell\}}\{dB2linear(S_u(neighbor\ cell, beam\ used\ in\ the\ scheduled\ PRB\ zone\ of\ u)\})$ The achievable spectrum efficiency of some embodiments is derived based on SINR. In some embodiments, this is conveyed to the L2 scheduler to accumulate the UE data volume: Datau+=SE (SINRPDSCH.u)*NbrPRBu*PRBSize (khz)*TTIDuration (ms) with the unit of bits. When it is time to report the UE throughput in E2SM-KPM, in some embodiments, the UE throughput is estimated as Throughputu=Datau/GranularityPeriod. After the report, in some embodiments, the L2 scheduler resets Datau for all users.

In some embodiments, E2SM-KPM and customized E2SM-RC are used. E2SM_KPM Report service style4 is used to deliver UE-level KPM reports with common conditions, in some embodiments. FIG. 12 illustrates an example of an E2SM-KPM SubscriptionRequest of some embodiments. FIG. 13 illustrates an example of a corresponding indication message of some embodiments that uses e2sm_kpm_ind_msg_format_3_t. FIG. 14 illustrates an example of the setting of we_meas_list for each user. FIG. 15 illustrates an example of some embodiments of the setting of meas_data_list. FIG. 16 illustrates an example of some embodiments of the setting of record_list for prb: 1 record. Lastly, FIG. 17 illustrates an example of some embodiments of the setting of record_list for throughput: 1 record.

In some embodiments, E2SM-RC ControlRequest is used for certain use cases. The UE ID field in the Control header and the RAN parameters in the Control Request are customized, in some embodiments, as the current O-RAN specification does not support the specific use-case for L2 scheduler.

For example, in some embodiments, a ControlRequest message is used for edge UE group assignment and removal. In some embodiments, this message is sent by the xApp to assign edge users into different edge user groups on a per-cell basis. When the L2 DU simulator receives the assignment message, it assigns user_attr[ue_id in the control req]→user_group_id=user group_id in the control request, in some embodiments. When the L2 DU simulator receives the removal message, in some embodiments, it resets user_attr[ue_id in the control req]→user_group_id=0. As such, this message needs to be sent for each edge user that needs the interference mitigation, in some embodiments. If a user no longer needs the mitigation, in some embodiments, another control request can be sent to remove it. FIG. 18 illustrates an example of so of the setting of e2sm_rc_ctrl_hdr_t. FIG. 19 illustrates an example of the setting of e2sm_rc_ctrl_msg_t, in some embodiments. FIG. 20 illustrates an example of some embodiments of the setting of 2nd ctrl_param.

In some embodiments a ControlRequest message for policy creation, update and removal is sent by the xApp to create, update or remove a policy associated with an edge user group or a cell beam group. When the DU simulator receives the message, in some embodiments, it stores the policy received in the message in a structure sch_policy_t and then calls the function cell::set_policy( ) to associate the policy with the user group id in the target cell. FIG. 21 illustrates an example of some embodiments of the setting of e2sm_rc_ctrl_hdr_t. FIG. 22 illustrates an example of some embodiments of the setting of ctrl action. FIG. 23 illustrates an example of some embodiments of the setting of e2sm_rc_ctrl_msg_t. FIG. 24 illustrates an example of some embodiments of the setting of $1^{st}$ ctrl_param. FIG. 25 illustrates an example of some embodiments of the setting of $2^{nd}$ ctrl_param. FIG. 26 illustrates an example of some embodiments of the setting of $3^{rd}$ ctrl_param (//only exist for policy add/update). FIG. 27 illustrates an example of some embodiments of the setting of $4^{th}$ ctrl_param.

The RIC platform and other terms used in this application as well as other RAN components and O-RAN (open RAN) components described in this document in the embodiments above are defined in U.S. Non-Provisional application Ser. No. 18/101,544, which is incorporated herein by reference.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 28 conceptually illustrates a computer system 2800 with which some embodiments of the invention are implemented. The computer system 2800 can be used to implement any of the above-described hosts, controllers, gateway, and edge forwarding elements. As such, it can be used to execute any of the above described processes. This computer system 2800 includes various types of non-transitory machine-readable media and interfaces for various other types of machine-readable media. Computer system 2800 includes a bus 2805, processing unit(s) 2810, a system memory 2825, a read-only memory 2830, a permanent storage device 2835, input devices 2840, and output devices 2845.

The bus 2805 collectively represents all system, peripheral, and chipset buses that communicatively connect the numerous internal devices of the computer system 2800. For instance, the bus 2805 communicatively connects the processing unit(s) 2810 with the read-only memory 2830, the system memory 2825, and the permanent storage device 2835.

From these various memory units, the processing unit(s) 2810 retrieve instructions to execute and data to process in order to execute the processes of the invention. The processing unit(s) 2810 may be a single processor or a multi-core processor in different embodiments. The read-only-memory (ROM) 2830 stores static data and instructions that are needed by the processing unit(s) 2810 and other modules of the computer system 2800. The permanent storage device 2835, on the other hand, is a read-and-write memory device. This device 2835 is a non-volatile memory unit that stores instructions and data even when the computer system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, etc.) as the permanent storage device. Like the permanent storage device 2835, the system memory 2825 is a read-and-write memory device. However, unlike storage device 2835, the system memory 2825 is a volatile read-and-write memory, such as random access memory. The system memory 2825 stores some of the instructions and data that the processor needs at runtime. In some embodiments, the invention's processes are stored in the system memory 2825, the permanent storage device 2835, and/or the read-only memory 2830. From these various memory units, the processing unit(s) 2810 retrieve instructions to execute and data to process in order to execute the processes of some embodiments.

The bus 2805 also connects to the input and output devices 2840 and 2845. The input devices 2840 enable the user to communicate information and select commands to the computer system 2800. The input devices 2840 include alphanumeric keyboards and pointing devices (also called "cursor control devices"). The output devices 2845 display images generated by the computer system 2800. The output devices 2845 include printers and display devices, such as cathode ray tubes (CRT) or liquid crystal displays (LCD). Some embodiments include devices such as touchscreens that function as both input and output devices 2840 and 2845.

Finally, as shown in FIG. 28, bus 2805 also couples computer system 2800 to a network 2865 through a network adapter (not shown). In this manner, the computer 2800 can be a part of a network of computers (such as a local area network ("LAN"), a wide area network ("WAN"), or an Intranet), or a network of networks (such as the Internet). Any or all components of computer system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of mitigating inter-region interference for a plurality of regions serviced by a plurality of RAN (Radio Access Network) base stations, the method comprising:
   for each region serviced by each particular RAN base station:
      identifying a set of one or more sub-regions receiving interfering signals from other RAN base stations;
      specifying, for each particular sub-region in the identified set of sub-regions that receives interfering signals from the particular RAN base station and another RAN base station,
      (i) an allow policy that identifies an allowed first set of carrier resources of the particular RAN base station that are to be allocated to a set of one or more user equipments operating in the particular sub-region, and
      (ii) a block policy that identifies a blocked second set of carrier resource of the other RAN base station that correspond to the first set of resources and that cannot be allocated to the set of user equipments operating in the particular sub-region; and
      distributing the specified allow and block policies to the RAN base stations;
      wherein the first set of carrier resources are a first set of PRBs and the second set of carrier resources are a second set of PRBs that match the first set of PRBs but are the PRBs that are carrier resources of the other RAN base stations.

2. The method of claim 1, wherein each RAN base station uses the distributed allow policies and block policies to manage carrier resources allocation for each particular sub-region.

3. The method of claim 1, wherein the carrier resources are segmented carrier resources.

4. The method of claim 3, wherein the segmented carrier resources are segmented in frequency.

5. The method of claim 3, wherein the segmented carrier resources are segmented in time.

6. The method of claim 3, wherein the segmented carrier resources are physical resource blocks (PRBs) and each PRB is a frequency-time block.

7. The method of claim 1, wherein the first set of PRBs are a same set of frequency-time blocks as the second set of PRBs.

8. The method of claim 1, wherein each block policy for each RAN base station prevents the RAN base station from using the second set of carrier resources to communicate with any user equipment in any beam that reaches or is directed at the identified sub-region for which the block policy is defined.

9. The method of claim 1, wherein each allow policy for each RAN base station directs the RAN base station to allocate carrier resources from the first set of resources to first set of user equipments in the sub-region for which the allow policy is defined, from the allowed first set of resources defined for the sub-region for which the allow policy is defined.

10. A non-transitory machine readable medium storing a program for execution by a set of processing units, the program for mitigating inter-region interference for a plurality of regions serviced by a plurality of RAN (Radio Access Network) base stations, the program comprising sets of instructions for:
   for each region serviced by each particular RAN base station:
   identifying a set of one or more sub-regions receiving interfering signals from other RAN base stations;
   specifying, for each particular sub-region in the identified set of sub-regions that receives interfering signals from the particular RAN base station and another RAN base station,
   (i) an allow policy that identifies an allowed first set of carrier resources of the particular RAN base station that are to be allocated to a set of one or more user equipments operating in the particular sub-region, and
   (ii) a block policy that identifies a blocked second set of carrier resource of the other RAN base station that correspond to the first set of resources and that cannot be allocated to the set of user equipments operating in the particular sub-region; and
   distributing the specified allow and block policies to the RAN base stations;
   wherein the first set of carrier resources are a first set of PRBs and the second set of carrier resources are a second set of PRBs that match the first set of PRBs but are the PRBs that are carrier resources of the other RAN base stations.

11. The non-transitory machine readable medium of claim 10, wherein each RAN base station uses the distributed allow policies and block policies to manage carrier resources allocation for each particular sub-region.

12. The non-transitory machine readable medium of claim 10, wherein the carrier resources are segmented carrier resources.

13. The non-transitory machine readable medium of claim 12, wherein the segmented carrier resources are segmented in frequency.

14. The non-transitory machine readable medium of claim 12, wherein the segmented carrier resources are segmented in time.

15. The non-transitory machine readable medium of claim 12, wherein the segmented carrier resources are physical resource blocks (PRBs) and each PRB is a frequency-time block.

16. The non-transitory machine readable medium of claim 10, wherein the first set of PRBs are a same set of frequency-time blocks as the second set of PRBs.

17. The non-transitory machine readable medium of claim 10, wherein each block policy for each RAN base station prevents the RAN base station from using the second set of carrier resources to communicate with any user equipment in any beam that reaches or is directed at the identified sub-region for which the block policy is defined.

18. The non-transitory machine readable medium of claim 10, wherein each allow policy for each RAN base station directs the RAN base station to allocate carrier resources from the first set of resources to first set of user equipments in the sub-region for which the allow policy is defined, from the allowed first set of resources defined for the sub-region for which the allow policy is defined.

* * * * *